(12) United States Patent
Ding et al.

(10) Patent No.: US 12,333,282 B2
(45) Date of Patent: Jun. 17, 2025

(54) UI SERVICE PACKAGE GENERATION AND REGISTRATION METHOD AND APPARATUS, AND UI SERVICE LOADING METHOD AND APPARATUS

(71) Applicant: HUAWEI TECHNOLOGIES CO., LTD., Guangdong (CN)

(72) Inventors: Yuan Ding, Shenzhen (CN); Yibin Wen, Shenzhen (CN); Zhenyu Liu, Shenzhen (CN); Jun Fan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 18/064,566

(22) Filed: Dec. 12, 2022

(65) Prior Publication Data

US 2023/0110520 A1 Apr. 13, 2023

Related U.S. Application Data

(63) Continuation of application No. PCT/CN2021/093980, filed on May 15, 2021.

(30) Foreign Application Priority Data

Jun. 12, 2020 (CN) .......................... 202010538371.0

(51) Int. Cl.
*G06F 8/38* (2018.01)
*G06F 8/71* (2018.01)
*G06F 9/451* (2018.01)

(52) U.S. Cl.
CPC .................. *G06F 8/38* (2013.01); *G06F 8/71* (2013.01); *G06F 9/451* (2018.02)

(58) Field of Classification Search
CPC .............. G06F 9/451; G06F 8/38; G06F 8/71
See application file for complete search history.

(56) References Cited

U.S. PATENT DOCUMENTS

| | | | |
|---|---|---|---|
| 8,347,263 | B1 | 1/2013 | Offer |
| 2005/0171961 | A1* | 8/2005 | Culbreth ................. G06F 9/451 |

(Continued)

FOREIGN PATENT DOCUMENTS

| | | | | |
|---|---|---|---|---|
| CN | 105701113 | A * | 6/2016 | ......... G06F 16/9574 |
| CN | 1057011113 | A * | 6/2016 | |

(Continued)

OTHER PUBLICATIONS

Jackson, "Micro Frontends," Jun. 19, 2019, retrieved on Mar. 5, 2023, retrieved from URL: <https://martinfowler.com/articles/micro-frontends.html>, 41 pages.

(Continued)

*Primary Examiner* — Ziaul A Chowdhury
(74) *Attorney, Agent, or Firm* — Fish & Richardson P.C.

(57) ABSTRACT

A UI service loading method is applied to a loading apparatus. One example method includes: receiving a loading request including a reuse path of a to-be-loaded UI service, where the loading request requests to load the to-be-loaded UI service; determining a dependency of the to-be-loaded UI service based on a dependency graph; and loading the to-be-loaded UI service and the dependency of the to-be-loaded UI service, where the reuse path of the to-be-loaded UI service indicates an access path of the to-be-loaded UI service, and the dependency graph indicates a dependency of at least one UI service in at least one UI service package, and indicates a UI service that references a UI service in the at least one UI service package as a dependency.

20 Claims, 13 Drawing Sheets

(56) References Cited

U.S. PATENT DOCUMENTS

| | | | |
|---|---|---|---|
| 2011/0078672 A1 | 3/2011 | Stark et al. | |
| 2016/0092246 A1* | 3/2016 | Lagerblad et al. | |
| 2021/0141663 A1* | 5/2021 | Deshpande | G06N 5/04 |
| 2021/0224488 A1* | 7/2021 | Arya | G06N 5/04 |
| 2023/0359515 A1* | 11/2023 | Xu | G06F 8/36 |

FOREIGN PATENT DOCUMENTS

| | | |
|---|---|---|
| CN | 105760192 A | 7/2016 |
| CN | 106250128 A | 12/2016 |
| CN | 108804159 A | 11/2018 |
| CN | 109416646 A | 3/2019 |
| WO | 2019079080 A1 | 4/2019 |

OTHER PUBLICATIONS

International Search Report and Written Opinion in International Appln. No. PCT/CN2021/093980, mailed on Aug. 16, 2021, 19 pages (with English translation).

Kikas et al., "Structure and Evolution of Package Dependency Networks," Proceedings of 2017 IEEE/ACM 14th International Conference On Mining Software Repositories (MSR), May 20, 2017, pp. 102-112.

Extended European Search Report in European Appln No. 21821477.3, dated Oct. 13, 2023, 9 pages.

Wikipedia [online], "File system—Wikipedia," Jun. 3, 2012, Retrieved from URL <https://en.wikipedia.org/w/index.php?title=File_systemandoldid-495826280>, pp. 1-19.

EP Communication Pursuant to Article 94(3) EPC in European Appln. No. 21821477.3, mailed on Dec. 3, 2024, 7 pages.

\* cited by examiner

UI SERVICE PACKAGE GENERATION AND REGISTRATION METHOD AND APPARATUS, AND UI SERVICE LOADING METHOD AND APPARATUS

CROSS-REFERENCE TO RELATED APPLICATIONS

This application is a continuation of International Application No. PCT/CN2021/093980, filed on May 15, 2021, which claims priority to Chinese Patent Application No. 202010538371.0, filed on Jun. 12, 2020. The disclosures of the aforementioned applications are hereby incorporated by reference in their entireties.

TECHNICAL FIELD

This application relates to the field of software engineering, and in particular, to a user interface (UI) service package generation and registration method and apparatus, and a UI service loading method and apparatus.

BACKGROUND

Building a conventional application is to implement, by a developer based on a process point (for example, a process point in work or a process point in life) of a user, a set of tool UIs that meet a calculation requirement of the process point. The set of tool UIs is a conventional tool application. A set of interaction operations generated by a user with a UI in a tool application based on a scenario of the user enable the application to output a calculation result that meets the scenario of the user.

With development of artificial intelligence (AI) technologies, to improve user experience in using an application, the developer builds an application that is based on the AI technologies. A scenario-based UI application is built based on the set of UI interaction operations generated by the user based on the scenario. The scenario-based UI application may provide a scenario UI for the user based on a user scenario recognized by AI. If the user interacts with the scenario UI once, a calculation result generated through a plurality of interactions between the user and the tool UI can be output.

In the conventional technology, a developer may develop the scenario-based UI application based on a micro frontend architecture. However, a UI cannot be efficiently reused between a plurality of scenario-based UI applications developed based on the micro frontend architecture. Therefore, integration into a scenario-based UI application developed based on an existing micro frontend architecture is difficult, and running efficiency is low during integration into the UI application through multiple nesting.

SUMMARY

This application provides a UI service package generation and registration method and apparatus, and a UI service loading method and apparatus. When a scenario-based UI application is built and developed by using a UI service in a UI service package according to the method, integration efficiency is high, and running efficiency of the scenario-based UI application is high.

To achieve the objectives, this application provides the following technical solutions.

According to a first aspect, this application provides a UI service loading method, and the method is applied to a loading apparatus. The method includes: receiving a loading request, where the loading request is used to request to load a to-be-loaded UI service, the loading request includes a reuse path of the to-be-loaded UI service, and the reuse path of the to-be-loaded UI service is used to indicate an access path of the to-be-loaded UI service; determining a dependency of the to-be-loaded UI service based on a dependency graph, where the dependency graph indicates a dependency of at least one UI service in at least one UI service package, and indicates a UI service that references any UI service in the at least one UI service package as a dependency; and loading the to-be-loaded UI service and the dependency of the to-be-loaded UI service.

In software engineering, a dependency is an algorithm or a function required for executing a task (for example, a UI service). The algorithm or function may be another task, such as a UI service or a runtime dependency. A dependency graph is used to indicate a dependency relationship between a plurality of tasks. The runtime dependency is a dependency required for running a UI.

According to the method provided in this application, the loading apparatus can determine, based on the reuse path of the to-be-loaded UI service, all dependencies of the to-be-loaded UI service at a time in the dependency graph used to indicate a dependency relationship between UI services. In this way, the loading apparatus can load the to-be-loaded UI service and the dependency of the to-be-loaded UI service based on the determined dependency of the to-be-loaded UI service. This improves efficiency of loading the to-be-loaded UI service and the dependency of the to-be-loaded UI service, that is, improves running efficiency of a scenario-based UI application obtained through integration by using the UI service.

In a possible design, the reuse path of the to-be-loaded UI service includes a fuzzy version number of a UI service package including the to-be-loaded UI service.

According to the possible design, in a process of loading the to-be-loaded UI service, the loading apparatus can find, based on the fuzzy version number in the reuse path, a latest-version UI service package including the to-be-loaded UI service. In this way, even if a version of the UI service package is updated, a scenario-based UI application obtained by a developer through integration based on a UI service in the UI service package does not need to be redeveloped. This saves resources.

In another possible design, the dependency graph is obtained based on dependency relationship sets of some or all of the at least one UI service package.

In another possible design, the dependency relationship sets include a dependency relationship of at least one UI service in the some or all UI service packages. The dependency relationship of the at least one UI service in the some or all UI service packages is used to indicate a dependency of the at least one UI service in the some or all UI service packages.

In another possible design, code of any UI service in the at least one UI service package includes a reuse path. The reuse path in the code of the UI service is used to indicate an access path of a dependency of the UI service.

In another possible design, the at least one UI service package is a UI service package registered in at least one UI service package registration apparatus.

According to the possible design, a same UI service package can be registered in different registration apparatuses, so that different developers can develop UI services in different application scenarios based on a UI service in the UI service package. This reduces workload of developing different scenario-based UI applications.

In another possible design, the at least one UI service package includes a first UI service package. A reuse path in code of a first UI service in the first UI service package meets at least one of the following conditions: The reuse path in the code of the first UI service is used to indicate an access path of a second UI service, where the second UI service is a dependency of the first UI service, the second UI service is any UI service in a second UI service package, and the second UI service package is a UI service package different from the first UI service package; or the reuse path in the code of the first UI service is used to indicate an access path of a runtime dependency item, where the runtime dependency item is a dependency of the first UI service, the runtime dependency item is any runtime dependency item in at least one common dependency UI service package, the at least one common dependency UI service package includes at least one runtime dependency item, and the at least one common dependency UI service package is used to provide a dependency for a UI service in at least one UI service package registered in the at least one UI service package registration apparatus. The first UI service package is any UI service package in the at least one UI service package, and the first UI service is any UI service in the first UI service package.

A runtime dependency is a dependency required for running a UI. After code of the runtime dependency is converted by a development framework, an obtained common dependency UI service package includes a runtime dependency item. Runtime dependency items one-to-one correspond to runtime dependencies.

According to the possible design, the UI service in this application can efficiently reuse another UI service or a runtime dependency item by using a reuse path. In this way, integration efficiency of a UI service that reuses another UI service or a runtime dependency item is high during integration into a scenario-based UI application.

In another possible design, the "determining a dependency of the to-be-loaded UI service based on a dependency graph" includes: determining a reuse path of the dependency of the to-be-loaded UI service based on the dependency graph.

In this way, after determining the reuse path of the dependency of the to-be-loaded UI service, the loading apparatus can find, based on a fuzzy version number in the reuse path, a latest-version UI service package including the dependency. In this way, even if a version of the UI service package is updated, a scenario-based UI application obtained by the developer through integration based on a UI service in the UI service package does not need to be redeveloped. This saves resources.

In another possible design, before the "loading the to-be-loaded UI service and the dependency of the to-be-loaded UI service", the method further includes: concurrently downloading the to-be-loaded UI service and the dependency of the to-be-loaded UI service based on the reuse path of the to-be-loaded UI service and the reuse path of the dependency of the to-be-loaded UI service. The "loading the to-be-loaded UI service and the dependency of the to-be-loaded UI service" includes: loading the downloaded to-be-loaded UI service and the downloaded dependency of the to-be-loaded UI service.

In this way, the loading apparatus can determine all dependencies of the to-be-loaded UI service at a time based on the dependency graph. Therefore, the loading apparatus can concurrently download the to-be-loaded UI service and the dependency of the to-be-loaded UI service. Compared with the conventional technology in which dependencies of tasks need to be serially downloaded, the method provided in this application improves efficiency of downloading the to-be-loaded UI service and the dependency of the to-be-loaded UI service.

In another possible design, the "loading the downloaded to-be-loaded UI service and the downloaded dependency of the to-be-loaded UI service" includes: sequentially loading the downloaded to-be-loaded UI service and the downloaded dependency of the to-be-loaded UI service based on a dependency relationship indicated by the dependency graph.

In another possible design, the method further includes: if the dependency of the to-be-loaded UI service is a runtime dependency item, starting a driver of the runtime dependency item when the runtime dependency item is loaded for the first time in a process of loading the at least one UI service and the dependency of the to-be-loaded UI service.

According to the possible design, compared with the conventional technology in which a driver of at least one runtime dependency item needs to be manually started, the method provided in this application reduces a workload of developing a UI application.

In another possible design, the method further includes: updating the dependency graph.

According to the possible design, the loading apparatus can determine the dependency of the to-be-loaded UI service in a latest dependency graph. In this way, even if the UI service package including the to-be-loaded UI service is updated, the to-be-loaded UI service may reuse a UI service different from a UI service reused before the update, to optimize performance or interface. According to the method in this application, the loading apparatus can determine the current latest dependency of the to-be-loaded UI service by using the updated dependency graph. In this way, a scenario-based UI application including the to-be-loaded UI service can present latest performance to a user without updating a version.

In another possible design, if the loading apparatus includes a first loading apparatus and a second loading apparatus, the first loading apparatus is isolated from the second loading apparatus. Both the first loading apparatus and the second loading apparatus are configured to load a UI service for a software system.

According to a second aspect, this application provides a UI service package generation method, and the method is applied to a UI service package generation apparatus. The method includes: obtaining code of a UI service, where the code of the UI service includes a reuse path, and the reuse path is used to indicate an access path of a dependency of the service; and converting the code of the UI service to obtain a first UI service package, where the first UI service package includes at least one UI service.

According to the method provided in this application, UI services in different UI service packages generated by the generation apparatus can be efficiently reused by each other by using reuse paths, so that a scenario-based UI application can be efficiently obtained through integration based on the UI service packages in the different UI service packages. Further, when a UI service in the scenario-based UI application is loaded, the UI service may be loaded by using a reuse path of the UI service, so that loading efficiency of the UI service can be improved, that is, running efficiency of the scenario-based UI application is improved.

In a possible design, a reuse path in code of a first UI service in the first UI service package meets at least one of the following conditions: The reuse path in the code of the first UI service is used to indicate an access path of a second UI service, where the second UI service is a dependency of the first UI service, the second UI service is any UI service in a second UI service package, and the second UI service package is a UI service package different from the first UI service package; or the reuse path in the code of the first UI service is used to indicate an access path of a runtime dependency item, where the runtime dependency item is a dependency of the first UI service, the runtime dependency item is any runtime dependency item in at least one common dependency UI service package, the at least one common dependency UI service package includes at least one runtime dependency item, and the at least one common dependency UI service package is used to provide a dependency for a UI service in at least one UI service package registered in at least one UI service package registration apparatus. The first UI service is any UI service in the first UI service package.

In another possible design, the reuse path in the code of the first UI service includes a fuzzy version number. The fuzzy version number is used to indicate the second UI service package or the at least one common dependency UI service package that meets a preset version condition.

According to the possible design, in the method provided in this application, a reuse path in code of a UI service in a UI service package generated by the generation apparatus includes a fuzzy version number. In this way, when the UI service is loaded, a latest version of the UI service package including the UI service can be found based on the fuzzy version number in the reuse path of the UI service. In this way, even if a version of the UI service package is updated, a scenario-based UI application obtained by a developer through integration based on the UI service in the UI service package does not need to be redeveloped. This saves resources.

In another possible design, the obtained code of the UI service is written based on a development framework. The "converting the code of the UI service to obtain a first UI service package" includes: converting the code of the UI service by using the development framework, to obtain the first UI service package.

In another possible design, the second UI service package or the common dependency UI service package is obtained based on the development framework.

According to the two possible designs, the developer can write the code of the UI service based on a same development framework, and then the UI service package generation apparatus converts the code of the UI service by using the development framework, to obtain the corresponding UI service package. In this way, a same UI service development standard lower a threshold for integrating UI services by the developer.

In another possible design, the "converting the code of the UI service by using the development framework, to obtain the first UI service package" includes: converting the code of the UI service based on a preset configuration file by using the development framework, to obtain the first UI service package. The configuration file is used to indicate a type of the first UI service package, and the type of the first UI service package is used to indicate a use of the first UI service package.

In another possible design, the type of the first UI service package includes at least one of the following: a business UI service package, a UI service package implementing a function of a loading apparatus, or a common dependency UI service package.

According to the two possible designs, the UI service package generation apparatus can generate UI service packages for different uses. In this way, the UI service packages generated by the UI service package generation apparatus can build a complete ecosystem for developing a scenario-based UI application based on the UI service packages.

In another possible design, the method further includes: publishing registration information of the first UI service package. The registration information includes a name of the first UI service package and a network address used to deploy the first UI service package. The registration information is used to register the first UI service package in the at least one UI service package registration apparatus.

According to the possible design, the UI service package obtained by using the method in this application can be obtained by registration apparatuses of different service providers. In this way, the different service providers can develop respective scenario-based UI applications based on the UI service package. This reduces workload of developing the scenario-based UI application by the service provider. This is because the service provider does not need to develop the UI service package anymore. Instead, the service provider only needs to reuse the UI service in the UI service package to develop a dedicated scenario-based UI application of the service provider.

In another possible design, the first UI service package includes a first dependency relationship set. The first dependency relationship set includes a dependency relationship of the at least one UI service in the first UI service package. The dependency relationship is used to indicate a dependency of the at least one UI service in the first UI service package.

In another possible design, the method further includes: sending the first dependency relationship set to the at least one UI service package registration apparatus, where the first UI service package is registered in the at least one UI service package registration apparatus.

According to the foregoing two possible designs, the UI service package registration apparatus can obtain a dependency relationship set of a UI service package generated by the UI service package generation apparatus. In this way, a loading apparatus can obtain, based on the dependency relationship set, a dependency graph required for loading the UI service. The dependency graph includes a dependency relationship of the UI service in the UI service package registered in the UI service package registration apparatus.

In this way, when loading a to-be-loaded UI service, the loading apparatus can simultaneously determine reuse paths of all dependencies of the to-be-loaded UI service in the dependency graph. In this way, the loading apparatus can concurrently download the to-be-loaded UI service and a dependency of the to-be-loaded UI service based on reuse paths of the to-be-loaded UI service and the dependency of the to-be-loaded UI service, and then sequentially load the to-be-loaded UI service and the dependency of the to-be-loaded UI service. This improves efficiency of downloading and loading the UI service and the dependency of the UI service, that is, improves efficiency of loading the to-be-loaded UI service that reuses a UI service or a runtime dependency item. This improves running efficiency of a scenario-based UI application including the to-be-loaded UI service.

In another possible design, the method further includes: updating the first UI service package. The updated first UI service package includes a second dependency relationship set. The second dependency relationship set includes a dependency relationship of at least one UI service in the updated first UI service package.

In another possible design, the method further includes: sending the second dependency relationship set to the at least one UI service package registration apparatus.

According to the foregoing two possible designs, the UI service package registration apparatus can obtain a latest dependency relationship set of the UI service package generated by the UI service package generation apparatus. In this way, the loading apparatus can obtain, based on the latest dependency relationship set, a latest dependency graph required for loading the UI service.

In this way, when loading a to-be-loaded UI service, the loading apparatus can simultaneously determine reuse paths of all dependencies of the to-be-loaded UI service in the latest dependency graph. In this way, the loading apparatus can concurrently download the to-be-loaded UI service and a dependency of the to-be-loaded UI service based on reuse paths of the to-be-loaded UI service and the dependency of the to-be-loaded UI service, and then sequentially load the to-be-loaded UI service and the dependency of the to-be-loaded UI service. This improves efficiency of downloading and loading the UI service and the dependency of the UI service, that is, improves running efficiency of the to-be-loaded UI service that reuses a UI service or a runtime dependency item.

In another possible design, all or some UI services in the first UI service are allowed to be referenced as dependencies.

According to a third aspect, this application provides a UI service package registration method, applied to a UI service package registration apparatus. The method includes: obtaining registration information of a first UI service package, where the registration information includes a name of the first UI service package and a network address used to deploy the first UI service package; and adding the registration information to a registration list of the UI service package registration apparatus, where code of a first UI service in the first UI service package includes a reuse path, the reuse path is used to indicate an access path of a dependency of the first UI service, and the first UI service is any UI service in the first UI service package.

According to the method, in UI service packages registered in the UI service package registration apparatus, UI services in different UI service packages can be efficiently reused by using reuse paths, so that a scenario-based UI application can be efficiently obtained through integration. In this way, a UI service loading apparatus can obtain registration information and a dependency relationship set of a UI service package registered in the UI service package registration apparatus, and generate a dependency graph used to determine a dependency of a to-be-loaded UI service. In this way, the UI service loading apparatus can simultaneously download and load all dependencies determined by using the dependency graph, and load the to-be-loaded UI service and all the dependencies of the to-be-loaded UI service, to improve loading efficiency of the to-be-loaded UI service, that is, improve running efficiency of a scenario-based UI application including the to-be-loaded UI service.

In a possible design, the reuse path meets at least one of the following conditions: The reuse path is used to indicate an access path of a second UI service, where the second UI service is a dependency of the first UI service, the second UI service is any UI service in a second UI service package, and the second UI service package is a UI service package different from the first UI service package; or the reuse path is used to indicate an access path of a runtime dependency item, where the runtime dependency item is a dependency of the first UI service, the runtime dependency item is any runtime dependency item in at least one common dependency UI service package, the at least one common dependency UI service package includes at least one runtime dependency item, and the at least one common dependency UI service package is used to provide a dependency for a UI service in at least one UI service package registered in at least one UI service package registration apparatus.

In another possible design, the method further includes: obtaining a dependency relationship set of the first UI service package. The dependency relationship set includes a dependency relationship of at least one UI service in the first UI service package. A dependency relationship of the first UI service is used to indicate a dependency of the first UI service.

In another possible design, the "obtaining a dependency relationship set of the first UI service package" includes: periodically obtaining the dependency relationship set from the first UI service package based on the network address in the registration information.

In another possible design, the "obtaining a dependency relationship set of the first UI service package" includes: receiving a dependency relationship set sent by an apparatus generating the first UI service package.

According to the foregoing several possible designs, the UI service package registration apparatus can obtain a dependency relationship set of a UI service package registered in the registration list of the registration apparatus. In this way, by interacting with the UI service package registration apparatus, the loading apparatus can obtain, from the UI service package registration apparatus, a dependency relationship of each UI service in the UI service package registered in the UI service package registration apparatus, so that when loading a to-be-loaded UI service, the loading apparatus can determine reuse paths of all dependencies of the to-be-loaded UI service based on the obtained dependency relationships. In this way, the loading apparatus can concurrently download the to-be-loaded UI service and a dependency of the to-be-loaded UI service based on reuse paths of the to-be-loaded UI service and the dependency of the to-be-loaded UI service, and then sequentially load the to-be-loaded UI service and the dependency of the to-be-loaded UI service. This improves efficiency of downloading and loading the UI service and the dependency of the UI service, that is, improves efficiency of loading the to-be-loaded UI service that reuses a UI service or a runtime dependency item. This improves running efficiency of a scenario-based UI application including the to-be-loaded UI service.

In another possible design, the reuse path includes a fuzzy version number of the first UI service package.

According to the possible design, when loading the UI service in the first UI service package, the loading apparatus can find the first UI service package of a latest version based on the fuzzy version number in the reuse path in the code of the UI service. In this way, even if a version of the first UI service package is updated, a scenario-based UI application obtained by a developer through integration based on the UI service in the first UI service package does not need to be redeveloped. This saves resources.

In another possible design, the method further includes: generating an initial reuse path of the at least one UI service in the first UI service package based on the registration information and a version number of the first UI service package. The initial reuse path includes the version number of the first UI service package.

In another possible design, the initial reuse path is used to determine a reuse path of the at least one UI service in the first UI service package. Both the initial reuse path and the reuse path are used to indicate an access path of the at least one UI service in the first UI service package.

According to the foregoing two possible designs, the developer can determine the reuse path of the at least one UI service based on the initial reuse path, so that the at least one UI service can be efficiently reused when a new scenario-based UI application is developed, and loading efficiency is high when the UI service is loaded based on the reuse path.

According to a fourth aspect, this application provides a UI service loading apparatus.

In a possible design, the UI service loading apparatus may be configured to perform any method provided in the first aspect. In this application, the UI service loading apparatus may be divided into function modules according to any method provided in the first aspect. For example, each function module may be obtained through division based on a corresponding function, or two or more functions may be integrated into one processing module.

For example, in this application, the UI service loading apparatus may be divided into a receiving unit, a determining unit, a loading unit, and the like based on functions. For descriptions of possible technical solutions performed by the function modules obtained through division and beneficial effects, refer to the technical solutions provided in the first aspect or corresponding possible designs of the first aspect. Details are not described herein again.

In another possible design, the UI service loading apparatus includes a memory and one or more processors. The memory is configured to store computer instructions, and the processor is configured to invoke the computer instructions to perform the method provided in any one of the first aspect and the possible designs of the first aspect.

According to a fifth aspect, this application provides a UI service package generation apparatus.

In a possible design, the UI service package generation apparatus may be configured to perform any method provided in the second aspect. In this application, the UI service package generation apparatus may be divided into function modules according to any method provided in the second aspect. For example, each function module may be obtained through division based on a corresponding function, or two or more functions may be integrated into one processing module.

For example, in this application, the UI service package generation apparatus may be divided into an obtaining unit, a conversion unit, and the like based on functions. For descriptions of possible technical solutions performed by the function modules obtained through division and beneficial effects, refer to the technical solutions provided in the second aspect or corresponding possible designs of the second aspect. Details are not described herein again.

In another possible design, the UI service package generation apparatus includes a memory and one or more processors. The memory is configured to store computer instructions, and the processor is configured to invoke the computer instructions to perform the method provided in any one of the second aspect and the possible designs of the second aspect.

According to a sixth aspect, this application provides a UI service package registration apparatus.

In a possible design, the UI service package registration apparatus may be configured to perform any method provided in the third aspect. In this application, the UI service package registration apparatus may be divided into function modules according to any method provided in the third aspect. For example, each function module may be obtained through division based on a corresponding function, or two or more functions may be integrated into one processing module. For example, in this application, the UI service package registration apparatus may be divided into an obtaining unit, an adding unit, and the like based on functions. For descriptions of possible technical solutions performed by the function modules obtained through division and beneficial effects, refer to the technical solutions provided in the third aspect or corresponding possible designs of the third aspect. Details are not described herein again.

In another possible design, the UI service package registration apparatus includes a memory and one or more processors. The memory is configured to store computer instructions, and the processor is configured to invoke the computer instructions to perform the method provided in any one of the third aspect and the possible designs of the third aspect.

According to a seventh aspect, this application provides a computer-readable storage medium, for example, a non-transient computer-readable storage medium. The computer-readable storage medium stores a computer program (or instructions). When the computer program (or the instructions) is run on a computer, the computer is enabled to perform any method according to any one of the possible implementations of the first aspect, the second aspect, or the third aspect.

According to an eighth aspect, this application provides a computer program product. When the computer program product runs on a computer, the method provided in any possible implementation of the first aspect, the second aspect, or the third aspect is performed.

According to a ninth aspect, this application provides a chip system. The chip system includes one or more interface circuits and one or more processors. The interface circuit is interconnected to the processor through a line. The interface circuit is configured to receive a signal from a memory, and send a signal to the processor. The signal includes computer instructions stored in the memory. The processor invokes the computer instructions to perform any method provided in any one of the possible implementations of the first aspect, the second aspect, or the third aspect.

According to a tenth aspect, this application provides a software system. The software system includes any UI service loading apparatus provided in any possible implementation of the fourth aspect, to load a to-be-loaded UI service. Alternatively, the software system includes any UI service package generation apparatus provided in any possible implementation of the fifth aspect, to generate a UI service package. Alternatively, the software system includes any UI service package registration apparatus provided in any possible implementation of the sixth aspect, to register a UI service package in a registration list of the software system.

According to an eleventh aspect, this application provides a computer device, including a processor and a memory. The memory stores computer instructions, and the processor is configured to run the computer instructions in the memory, to perform any method provided in any possible implementation of the first aspect, the second aspect, or the third aspect.

It may be understood that any one of the apparatus, the computer storage medium, the computer program product, the chip system, or the like provided above may be applied to a corresponding method provided above. Therefore, for beneficial effects that can be achieved by the apparatus, the computer storage medium, the computer program product, the chip system, or the like, refer to the beneficial effects of the corresponding method. Details are not described herein again.

In this application, names of the UI service loading apparatus, the UI service package generation apparatus, and the UI service package generation apparatus do not constitute any limitation to devices or function modules. During actual implementation, these devices or function modules may have other names. Each device or function module falls within the scope defined by the claims and their equivalent technologies in this application, provided that a function of the device or function module is similar to that described in this application.

These aspects or other aspects in this application are more concise and comprehensible in the following descriptions.

DESCRIPTION OF EMBODIMENTS

Figure 1:
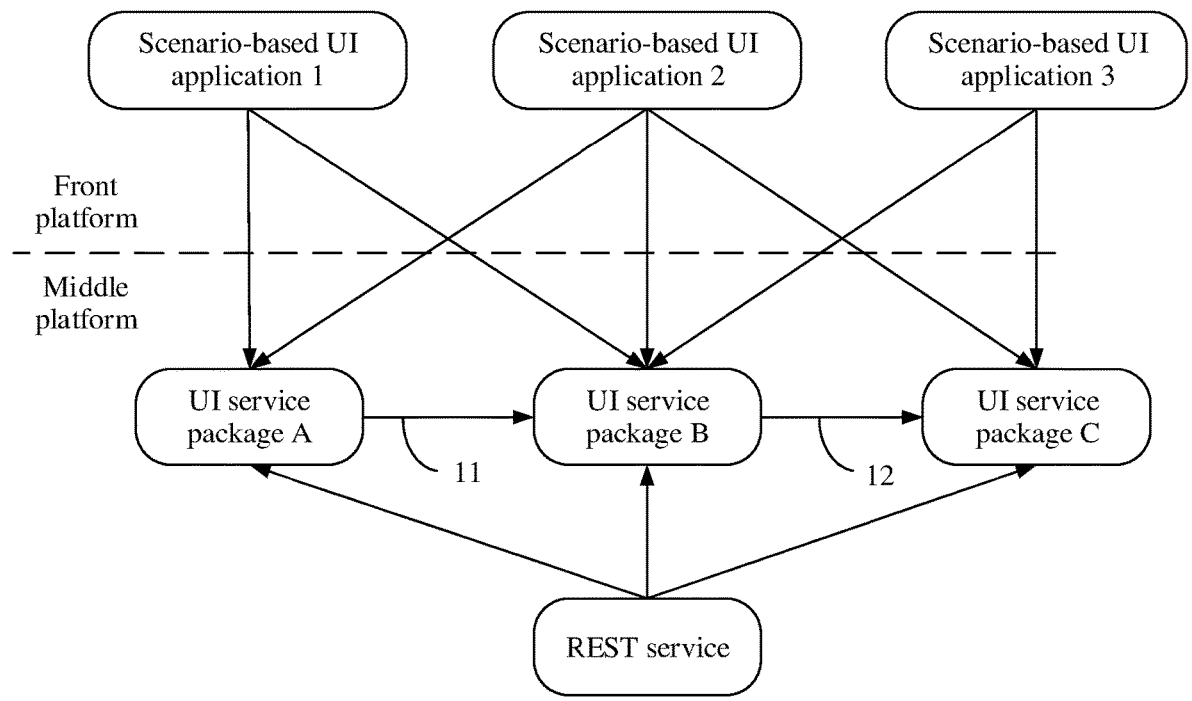
FIG. 1 is a schematic diagram of developing a scenario-based UI application based on a UI service package according to an embodiment of this application.

To better understand the embodiments of this application, the following describes some terms or technologies used in the embodiments of this application.

(1) Development Framework

The development framework may also be referred to as a scaffolding. The development framework is a software development tool, used to provide a basic environment for software development, and used to build or compile developed code into a software package that can be run by the framework.

The development framework is essentially a software package (or referred to as a development framework software package). When developing software, a developer can use a package management tool to introduce the development framework software package.

(2) User Interface

The UI may also be referred to as a user interface, and is a medium for interaction and information exchange between a software system and a user. The UI can be used to implement conversion between an internal form of information and a form acceptable to humans. The form acceptable to humans includes an image, audio, or the like. Therefore, a visual interface or audio used for human-computer interaction may be referred to as a UI.

As a result, UIs are widely defined, and UIs exist in all domains in communication between humans and mechanical information.

(3) Dependency

In a software system, a task A references a task B. When the task A is to be performed, the task B needs to be performed before the task A is performed. In this case, the task B may be referred to as a dependency of the task A.

(4) Runtime Dependency

A specific representation form of the runtime dependency may be an algorithm. The runtime dependency is a dependency required for running a UI, for example, a control required for running the UI and a button on the UI.

(5) Domain Model (Domain Model)

By referring to the method of humans to understand different types of things in the world, humans abstract data of an information system into data models by service types. If a group of data models that have a one-to-many association relationship with each other are classified into a group, the group may be referred to as a domain. The data models in the domain are referred to as domain models.

(6) Combinational Logic Function

A combinational logic function is used to provide text data for a UI. For example, the combinational logic function may convert a data flow of a domain model in a microservice (microservice) into a data flow of a UI model, and provide the data flow of the UI model for a corresponding UI for display.

(7) Scenario UI and Scenario-Based UI Application

A user generates a set of interaction operations with a tool UI based on a scenario of the user. If a developer builds the set as a UI, the UI is a scenario UI. In this way, an application including the scenario UI may be referred to as a scenario-based UI application.

The scenario of the user may be referred to as a user scenario. Generally, a related factor used to recognize the user scenario may include at least one of an identity of the user, a time, or a geographical location of the user, and certainly, is not limited thereto.

(8) Graph

In the theory of computer data structure, there are two types of data structures, one is a set-type data structure and the other is graph-type data structure. For example, the graph may be a directed acyclic graph (DAG). A directed graph in which it is impossible to return to a vertex through several edges from the vertex is referred to as a DAG graph.

In embodiments of this application, a dependency graph is used to indicate a dependency relationship between UI services. Here, the dependency graph is a graph-type data structure. A vertex in the dependency graph is used to indicate a UI service and a runtime dependency item, and a directed edge between vertices in the dependency graph is used to indicate a dependency relationship between UI services (or between a UI service and a runtime dependency item).

(9) Rendering

After processing web page source code, a terminal device obtains a visualized web page. This process may be referred to as rendering.

(10) Front Platform, Middle Platform, and Back Platform

The front platform is a frontend platform consisting of various front platform systems. Each front platform system is a user contact point. In an example, a system that is directly used by an end user or interacted with an end user of an enterprise is an intersection point between the enterprise and the end user. For example, a website and a mobile phone application (APP) directly used by the user belong to the front platform.

The back platform is a backend platform consisting of back platform systems. In an example, each back platform system may be used to manage a type of core resources (data+computing) of an enterprise, for example, a financial system, a product system, a customer management system, and a warehouse logistics management system. Such systems constitute the back platform of the enterprise. As core computing resources of the enterprise, the infrastructure and computing platform are also a part of the back platform.

The middle platform is between the front platform and the back platform, and is a set of shared middleware. Generally, the middle platform extracts data from the back platform and provides public data for different front platform systems.

(11) Other Terms

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In this application, the term "at least one" means one or more, and the term "a plurality of" means two or more. For example, a plurality of second packets mean two or more second packets. Terms "system" and "network" may be used interchangeably in this specification.

It should be understood that the terms used in the descriptions of various examples in this specification are merely intended to describe specific examples but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that sequence numbers of processes do not mean execution sequences in various embodiments of this application. The execution sequences of the processes should be determined based on functions and internal logic of the processes, and should not be construed as any limitation on the implementation processes of embodiments of this application.

It should be understood that determining B based on A does not mean that B is determined based on only A, but B may alternatively be determined based on A and/or other information.

It should be further understood that the term "include" (or referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any proper manner.

Embodiments of this application provide a method for generating and registering a UI service package, and loading a UI service. In the method, at least one UI service package is generated in advance, and each of the at least one UI service package includes at least one UI service. A UI service in the at least one UI service package may reuse a UI service in another UI service package.

Further, the at least one UI service package is registered in at least one UI service package registration apparatus. In this way, a loading apparatus can obtain a dependency relationship of the at least one UI service package from the at least one UI service package registration apparatus. Then, the loading apparatus may load a to-be-loaded UI service from the at least one UI service package based on the dependency relationship. After code of the to-be-loaded UI service is rendered by a software system, at least one UI may be obtained.

In this way, when a UI application is built by using the UI service in the UI service package, redundant code used when a developer builds the UI application can be reduced, to reduce a waste of resources. In addition, according to the UI service loading method provided in this embodiment of this application, efficiency of loading a UI service can be improved, to improve display efficiency of a UI in a UI application built based on the loaded UI service, and further improve user experience. The UI application may be a scenario-based UI application, the scenario-based UI application may include at least one scenario UI, and the at least one scenario UI is obtained based on at least one UI service.

A specific representation of the UI service may be an algorithm. The algorithm may include a UI algorithm, and the UI may be obtained after the UI algorithm is run. Optionally, the algorithm may further include a combinational logic function, and the combinational logic function is used to provide text data for the UI obtained by using the UI algorithm.

For example, FIG. 1 is a schematic diagram of developing a scenario-based UI application based on a UI service package according to an embodiment of this application.

As shown in FIG. 1, a UI service package A, a UI service package B, and a UI service package C may be generated at different domain middle platforms of an enterprise in advance. For example, the UI service package A may be generated at a domain middle platform 1, the UI service package B may be generated at a domain middle platform 2, and the UI service package C may be generated at a domain middle platform 3. This is not limited. An arrow 11 indicates that at least one UI service in the UI service package A reuses at least one UI service in the UI service package B, and an arrow 12 indicates that at least one UI service in the UI service package B reuses at least one UI service in the UI service package C.

As shown in FIG. 1, when a loading apparatus loads at least one UI service in the UI service package A and at least one UI service in the UI service package B at the front platform, a function of a scenario-based UI application 1 may be implemented. When the loading apparatus loads at least one UI service in the UI service package A, at least one UI service in the UI service package B, and at least one UI service in the UI service package C at the front platform, a function of a scenario-based UI application 2 may be implemented. When the loading apparatus loads at least one UI service in the UI service package B and at least one UI service in the UI service package C at the front platform, a function of a scenario-based UI application 3 may be implemented. Herein, the scenario-based UI application 1, the scenario-based UI application 2, and the scenario-based UI application 3 may be scenario-based UI applications applicable to different user scenarios.

When a terminal device used by a user has an artificial intelligence (AI) function, the AI of the terminal device may recognize a current user scenario of the user.

In an example, the AI may recognize a factor (for example, at least one of an identity of the user, a time, or a geographical location of the user) related to the user scenario, to recognize the current user scenario of the user. For example, the AI may obtain identity information of the user in the terminal device to determine the identity of the user. For example, the user may be a student. Alternatively, the AI may determine the current user scenario based on current time. For example, the current time is working time or rest time. Alternatively, the AI may further determine the current user scenario based on global positioning system (GPS) information of the terminal device. For example, a current geographical location of the user is a workplace (an office building or the like) or a living place (a residential area or the like).

In this way, the terminal device recognizes the current user scenario by analyzing the factor related to the user scenario by using the AI technology, and can further recommend a scenario UI related to the user scenario to the user, to improve user experience.

Certainly, the foregoing description merely lists several user scenarios as examples, and describes several manners in which the terminal device recognizes the user scenario through the AI as examples. This is not actually limited thereto.

Embodiments of this application provide a UI service package generation apparatus (for ease of description, the "UI service package generation apparatus" is referred to as a "generation apparatus" for short below). The generation apparatus may be configured to perform the UI service package generation method provided in embodiments of this application. Embodiments of this application further provide a UI service package registration apparatus (for ease of description, the "UI service package registration apparatus" is referred to as a "registration apparatus" for short below). The registration apparatus may be configured to perform the UI service package registration method provided in embodiments of this application.

It should be understood that the generation apparatus and the registration apparatus may be integrated on a same serving node, or may be separately disposed on different serving nodes. The serving node may be a serving node implemented by using a physical machine or a virtual machine. In an example, the serving node may be a server or a general-purpose PC. A specific form of the serving node is not limited in embodiments of this application.

Optionally, the serving nodes may be serving nodes at a same enterprise middle platform, or may be serving nodes at different enterprise middle platforms. This is not limited.

It should be understood that when the generation apparatus and the registration apparatus are integrated on a same serving node, the generation apparatus and the registration apparatus may be isolated from each other by using hardware or software.

When the generation apparatus and the registration apparatus are disposed on different serving nodes, the generation apparatus and the registration apparatus may communicate with each other in a wired or wireless manner. Optionally, the generation apparatus and the registration apparatus may further communicate with each other through a third-party platform. The generation apparatus and the registration apparatus each may communicate with the third-party platform in a wired or wireless manner.

Figure 2:
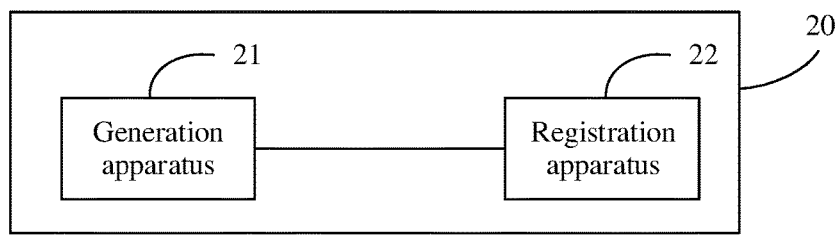
FIG. 2 is a schematic diagram 1 of a network architecture according to an embodiment of this application.

FIG. 2 is a schematic diagram of a network architecture 20 according to an embodiment of this application. The network architecture 20 includes a generation apparatus 21 and a registration apparatus 22. The generation apparatus 21 and the registration apparatus 22 may communicate with each other in a wired or wireless manner.

Figure 3:
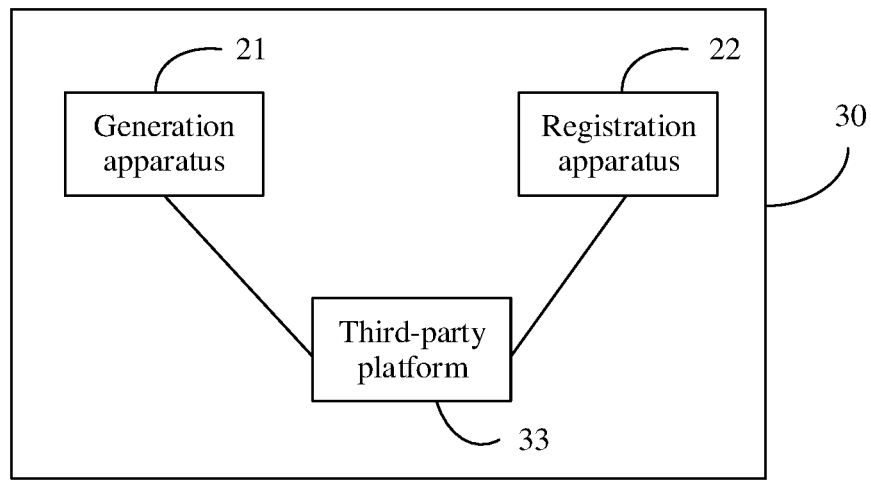
FIG. 3 is a schematic diagram 2 of a network architecture according to an embodiment of this application.

FIG. 3 is a schematic diagram of another network architecture 30 according to an embodiment of this application. The network architecture 30 includes a generation apparatus 21, a registration apparatus 22, and a third-party platform 33. The generation apparatus 21 and the third-party platform 33 may communicate with each other in a wired or wireless manner. The registration apparatus 22 and the third-party platform 33 may communicate with each other in a wired or wireless manner.

Figure 4:
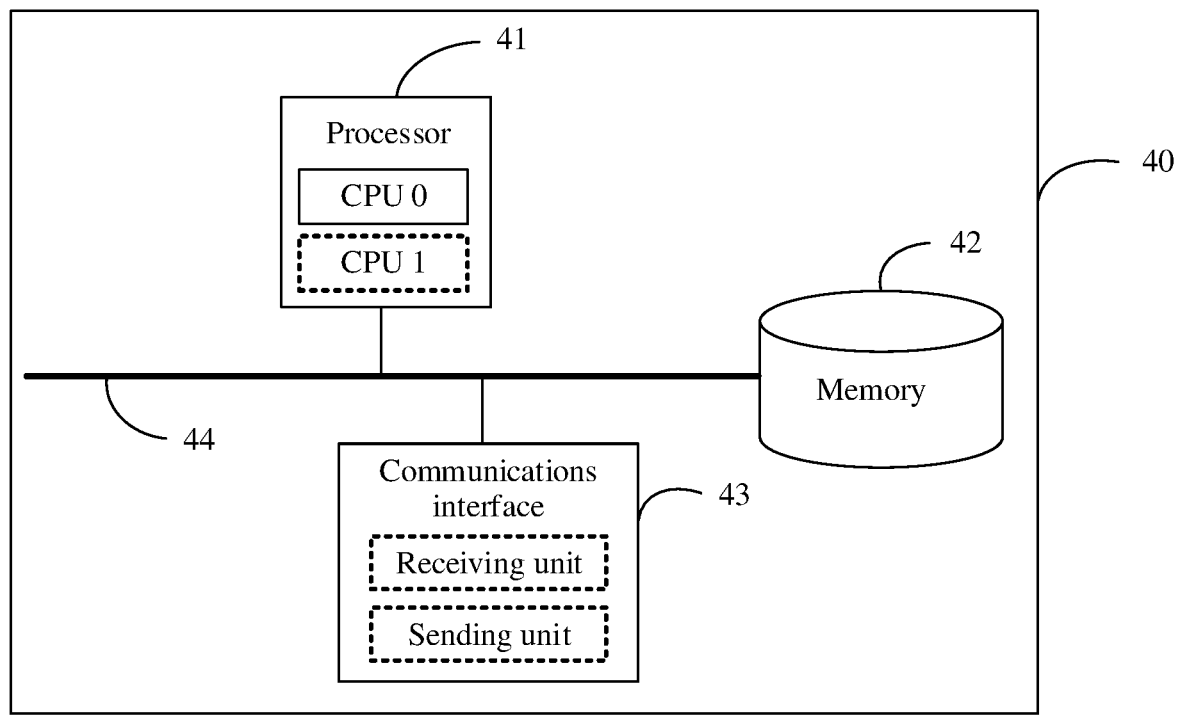
FIG. 4 is a schematic diagram of a hardware structure of a computer device according to an embodiment of this application.

FIG. 4 shows a hardware structure of a computer device 40 according to an embodiment of this application. The computer device 40 may be the generation apparatus, or may be the registration apparatus. As shown in FIG. 4, the computer device 40 may include a processor 41, a memory 42, a communications interface 43, and a bus 44. The processor 41, the memory 42, and the communications interface 43 may be connected through the bus 44.

The processor 41 is a control center of the computer device 40, and may be a general-purpose central processing unit (CPU), another general-purpose processor, or the like. The general-purpose processor may be a microprocessor, any conventional processor, or the like.

In an example, the processor 41 may include one or more CPUs, for example, a CPU 0 and a CPU 1 shown in FIG. 4.

The memory 42 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of instructions or a data structure and capable of being accessed by a computer, but is not limited thereto.

In a possible implementation, the memory 42 may be independent of the processor 41. The memory 42 may be connected to the processor 41 through the bus 44, and is configured to store data, instructions, or program code. When invoking and executing the instructions or the program code stored in the memory 42, the processor 41 can implement the UI service package generation method provided in embodiments of this application, or can implement the UI service package registration method provided in embodiments of this application.

In another possible implementation, the memory 42 may alternatively be integrated with the processor 41.

The communications interface 43 is configured to connect the computer device 40 to another device (for example, a UI loading apparatus) through a communications network. The communications network may be Ethernet, a radio access network (RAN), wireless local area networks (WLAN), or the like. The communications interface 43 may include a receiving unit configured to receive data and a sending unit configured to send data.

The bus 44 may be an industry standard architecture (ISA) bus, a peripheral component interconnect (PCI) bus, an extended industry standard architecture (EISA) bus, a peripheral component interconnect express (PCIe) bus, or the like. The bus may be classified into an address bus, a data bus, a control bus, and the like. For ease of representation, only one thick line is used to represent the bus in FIG. 4, but this does not mean that there is only one bus or only one type of bus.

It should be noted that the structure shown in FIG. 4 does not constitute a limitation on the computer device 40. In addition to the components shown in FIG. 4, the computer device 40 may include more or fewer components than those shown in the figure, or some components may be combined, or a different component arrangement may be used.

Embodiments of this application further provide a loading apparatus. The loading apparatus may be configured to perform the UI service loading method provided in embodiments of this application. In an example, the loading apparatus may be a loader (loader). The loading apparatus may be applied to a terminal device. Specifically, the terminal device may be a portable device such as a mobile phone, a tablet computer, or a wearable electronic device, may be a device such as a vehicle-mounted device, an intelligent robot, or a smart speaker. Alternatively, the terminal device may be a computing device such as a personal computer (PC), a personal digital assistant (PDA), a netbook, or a server. This is not limited.

The loading apparatus may communicate with the registration apparatus in a wired or wireless manner.

Figure 5:
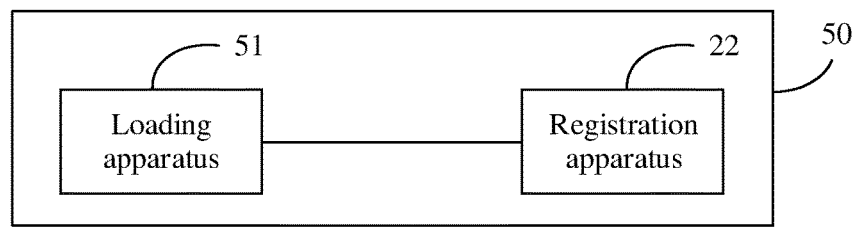
FIG. 5 is a schematic diagram 3 of a network architecture according to an embodiment of this application.

FIG. 5 shows another network architecture 50 according to an embodiment of this application. The network architecture 50 includes a loading apparatus 51 and a registration apparatus 22. The loading apparatus 51 and the registration apparatus 22 may communicate with each other in a wired or wireless manner.

Figure 6:
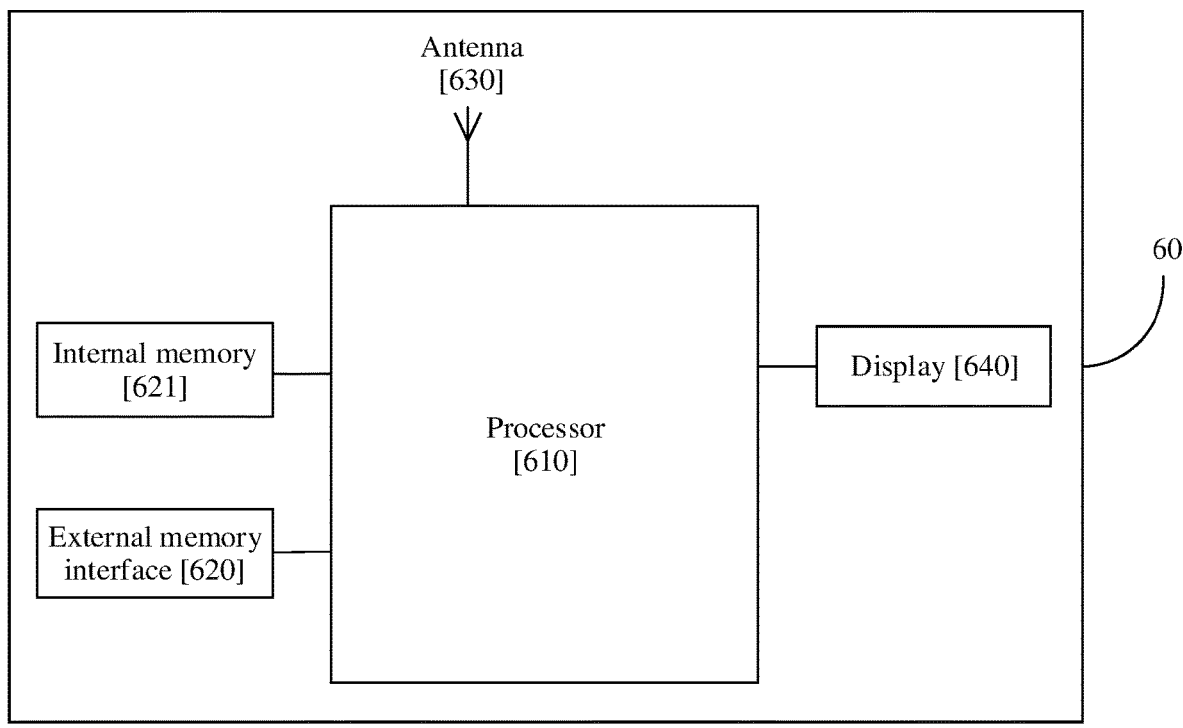
FIG. 6 is a schematic diagram of a hardware structure of a mobile phone according to an embodiment of this application.

As shown in FIG. 6, an example in which the terminal device is a mobile phone is used. FIG. 6 shows a hardware structure of a mobile phone 60. As shown in FIG. 6, the mobile phone 60 may include a processor 610, an external memory interface 620, an internal memory 621, an antenna 630, a display 640, and the like.

It may be understood that the structure shown in embodiments of this application does not constitute a specific limitation on the mobile phone 60. In some other embodiments of this application, the mobile phone 60 may include more or fewer components than those shown in the figure, or some components may be combined, or some components may be split, or there may be a different component layout. The components shown in the figure may be implemented by hardware, software, or a combination of software and hardware.

The processor 610 may include one or more processing units. For example, the processor 610 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone 60. The controller may generate an operation control signal based on instruction operation code and a time sequence signal, to control to read instructions and execute instructions.

A memory may be further disposed in the processor 610, and is configured to store instructions and data. In some embodiments, the memory in the processor 610 is a cache. The memory may store instructions or data just used or cyclically used by the processor 610. If the processor 610 needs to use the instructions or the data again, the processor 610 may directly invoke the instructions or the data from the memory. This avoids repeated access, reduces waiting time of the processor 610, and improves system efficiency.

In some embodiments, the processor 610 may include one or more interfaces. The interface may include an inter-integrated circuit (I2C) interface, an inter-integrated circuit sound (I2S) interface, a pulse code modulation (PCM)

interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDA) and a serial clock line (SCL).

The I2S interface may be configured to perform audio communication. The PCM interface may also be configured to perform audio communication, and sample, quantize, and code an analog signal.

The UART interface is a universal serial data bus, and is used for asynchronous communication. The bus may be a two-way communications bus. The bus performs a conversion between serial communication and parallel communication on to-be-transmitted data.

The MIPI interface may be configured to connect the processor 610 to a peripheral component such as the display 640 or a camera.

The MIPI interface includes a camera serial interface (CSI), a display serial interface (DSI), and the like.

The GPIO interface may be configured by software. The GPIO interface may be configured as a control signal or a data signal.

The USB interface is an interface that conforms to a USB standard specification, and may be specifically a mini USB interface, a micro USB interface, a USB type-C interface, or the like. The USB interface may be configured to connect to a charger to charge the mobile phone 60, or may be configured to transmit data between the mobile phone 60 and a peripheral device, or may be configured to connect to a headset for playing audio through the headset. This interface may further be configured to connect to another electronic device, for example, an augmented reality (AR) device.

It may be understood that an interface connection relationship between the modules shown in embodiments of this application is merely an example for description, and does not constitute a limitation on the structure of the mobile phone 60. In some other embodiments of this application, the mobile phone 60 may alternatively use an interface connection manner different from that in the foregoing embodiment, or use a combination of a plurality of interface connection manners.

The external memory interface 620 may be connected to an external storage card, for example, a micro SD card, to extend a storage capability of the mobile phone 60. The external storage card communicates with the processor 610 through the external memory interface 620, to implement a data storage function. For example, files such as music and videos are stored in the external storage card.

The internal memory 621 may be configured to store computer-executable program code. The executable program code includes instructions. The processor 610 runs the instructions stored in the internal memory 621, to perform various function applications of the mobile phone 60 and data processing.

A wireless communication function of the mobile phone 60 may be implemented by using the antenna 630, the modem processor, the baseband processor, and the like. The modem processor may include a modulator and a demodulator.

The antenna 630 is configured to transmit and receive an electromagnetic wave signal. Each antenna in the mobile phone 60 may be configured to cover one or more communication bands. Different antennas may be further multiplexed, to increase antenna utilization. For example, the antenna 630 may be multiplexed as a diversity antenna of a wireless local area network. In some other embodiments, the antenna may be used in combination with a tuning switch.

In an example, the antenna 630 may be configured to: when the loading apparatus downloads a to-be-loaded UI service, receive data of the to-be-loaded UI service in a UI service package deployed at a preset network address.

The mobile phone 60 implements a display function by using the GPU, the display 640, the application processor, and the like. The GPU is a microprocessor for image processing, and is connected to the display 640 and the application processor. The GPU is configured to perform mathematical and geometric computation, and render an image. The processor 610 may include one or more GPUs that execute program instructions to generate or change display information. The display 640 is configured to display an image, a video, and the like. For example, after a UI service loaded in the UI service loading method provided in embodiments of this application is rendered, the UI service may be displayed on the display 640. The display 640 includes a display panel.

The NPU is a neural-network (NN) computing processor. The NPU quickly processes input information by referring to a biological neural network structure, for example, by referring to a mode of transfer between human brain neurons, and may further continuously perform self-learning. The NPU can implement applications such as intelligent cognition of the mobile phone 60, such as image recognition, facial recognition, speech recognition, and text understanding.

It should be noted that the structure shown in FIG. 6 does not constitute a limitation on the terminal device 60. In addition to the components shown in FIG. 6, the terminal device 60 may include more or fewer components than those shown in the figure, or some components may be combined, or a different component arrangement may be used.

The following describes types of UI service packages provided in embodiments of this application.

In embodiments of this application, the UI service packages may be classified into the following several types based on uses of the UI service packages:

Type 1: Business UI Service Package

After a UI service in the business UI service package is loaded and rendered, at least one UI may be obtained. The business UI service package may include a domain UI service package and a scenario UI service package.

One domain UI service package may include at least one UI service. UI services in one domain UI service package may be UI services in the same domain. Different domain UI service packages may include UI services in different domains. In an example, the UI services in different domains may be legal affairs-related UI services, contract-related UI services, and product-related UI services.

For example, a service provider may divide data in an enterprise resource planning (ERP) system into UI services in different domains by domain. In this way, a generation apparatus can generate, based on a UI service in a same domain, a domain UI service package corresponding to the domain. For example, the generation apparatus may generate a UI service package in a product domain based on a UI service in the product domain in the ERP system, or the generation apparatus may generate a UI service package in a quotation domain based on a UI service in the quotation domain.

UI services in different domain UI service packages may be reused by each other. For example, a UI service in the UI service package in the product domain may reuse a UI service in the UI service package in the quotation domain. A UI service in the UI service package in the quotation domain may also reuse a UI service in the UI service package in the product domain. This is not limited.

The scenario UI service package may include at least one scenario UI service, and one scenario UI service may be obtained based on at least two UI services in a domain UI service package. Herein, the at least two UI services may be from a same domain UI service package, or may be from different domain UI service packages. This is not limited.

When the at least two UI services are from different domain service packages, for example, the at least two UI services may respectively be from a domain service package 1 and a domain service package 2. The domain service package 1 and the domain service package 2 may be domain service packages generated by generation apparatuses at a middle platform of a same service provider, or may be domain service packages generated by generation apparatuses at middle platforms of different service providers. For example, the domain service package 1 may be a domain service package generated by a generation apparatus at a middle platform of a service provider 1, and the domain service package 2 may be a domain service package generated by a generation apparatus at a middle platform of the service provider 2. This is not limited.

It may be understood that the scenario UI service package and a domain UI service package including a UI service reused by a UI service in the scenario UI service package may be UI service packages generated by generation apparatuses at a middle platform of a same service provider, or may be UI service packages generated by generation apparatuses at middle platforms of different service providers. This is not limited.

It may be understood that different scenario UI service packages may provide UI services in different application scenarios.

For example, based on a UI service in the UI service package in the product domain and a UI service in the UI service package in the quotation domain, a scenario UI service for a quotation of a communications operator may be obtained, or a scenario UI service for a quotation of an enterprise may be obtained, or a scenario UI service used to provide a device quotation may be obtained, or a scenario UI service used to provide a service quotation may be obtained. Correspondingly, at a middle platform of an enterprise, a generation apparatus may generate a quotation scenario UI service package oriented to a communications operator, a quotation scenario UI service package oriented to an enterprise, a quotation scenario UI service package for a device quotation, a quotation scenario UI service package for a service quotation, or the like. In this way, the enterprise can provide UI services for users in different application scenarios.

It may be understood that a UI service in the scenario UI service package reuses a UI service in the domain UI service package, and UI services in different scenario UI service packages may also reuse each other. For example, a scenario UI service in the quotation scenario UI service package oriented to a communications operator can reuse a scenario UI service in the quotation scenario UI service package for a device quotation.

It should be noted that both the UI service in the domain UI service package and the UI service in the scenario UI service package may reuse a runtime dependency item in a common dependency UI service package. For specific descriptions of the common dependency UI service package, refer to the following descriptions in S102. Details are not described herein.

Figure 7:
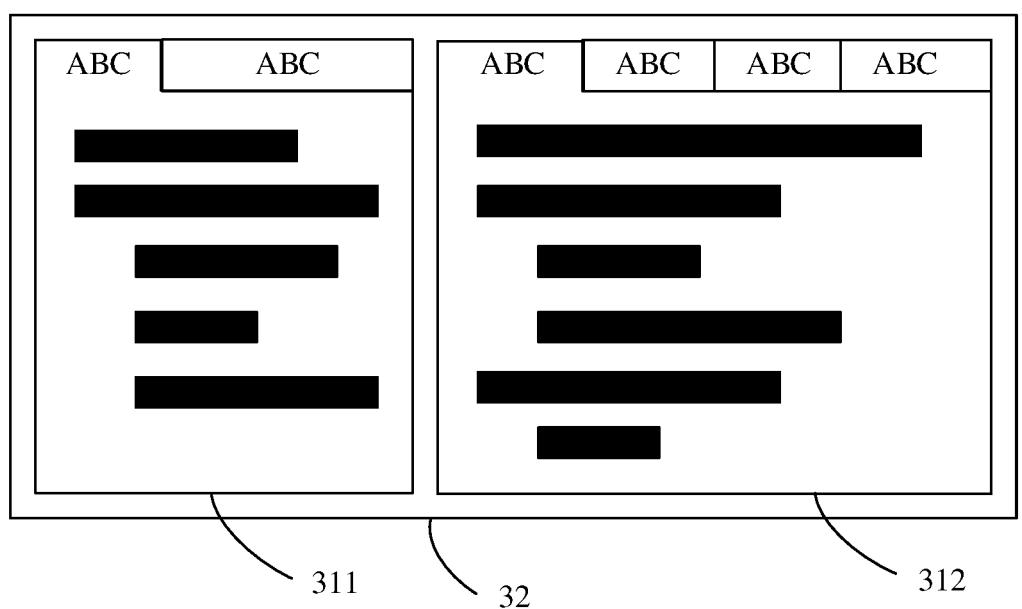
FIG. 7 is a schematic diagram of different types of UI service packages according to an embodiment of this application.

FIG. 7 is an example of a schematic diagram of a relationship between the domain UI service package and the scenario UI service package in the business UI service package. As shown in FIG. 7, a UI 311 and a UI 312 in FIG. 7 are two UIs corresponding to a UI service in the domain UI service package, and a UI 32 may be a UI corresponding to a UI service in the scenario UI service package.

It should be noted that the business UI service packages may be business UI service packages generated based on different software systems. The software system may be a software app, a computer operating system, or a cloud platform constructed based on same user authorization, same runtime, or same user experience. For example, the software system may be an app such as a browser or WeChat. Alternatively, the software system may be an Android (android) operating system or an iOS operating system used by a mobile device, a Windows (windows) operating system or an iOS operating system used by a computer, or the like. Alternatively, the software system may be a cloud platform such as Huawei Cloud. It may be understood that the software system may alternatively be a plug-in introduced by the app or computer operating system, for example, a patch plug-in introduced by an operating system A.

In an example, the generation apparatus provided in embodiments of this application may generate, based on the Huawei HarmonyOS, a business UI service package applicable to the Huawei HarmonyOS.

It may be understood that the at least one business UI service package in embodiments of this application may constitute a tool UI application implementing a function, or constitute a scenario-based UI application applicable to a user scenario. After any UI service in the at least one business UI service package is rendered, a UI of the tool UI application or the scenario-based UI application is obtained. Herein, the tool UI application may be a tool app, for example, an app such as Taobao or Weibo. This is not limited. The scenario-based UI application may be a scenario-based app.

It should be understood that a UI is displayed in different formats in different software systems. Therefore, in different software systems, business UI service packages forming UI applications with a same function are business UI service packages generated based on different software systems. For example, a business UI service package 1 generated based on the operating system A may be used to obtain a UI application 1 applicable to the operating system A, and a business UI service package 2 generated based on an operating system B may be used to obtain a UI application 2 applicable to the operating system B. The UI application 1 and the UI application 2 implement a same function purpose.

Type 2: UI Service Package Implementing a Function of a Loading Apparatus

Herein, the loading apparatus may be configured to load at least one UI service in at least one business UI service package and a dependency of the at least one UI service.

In embodiments of this application, a generation apparatus may generate a UI service package implementing a function of the loading apparatus, and deploy the UI service package in a network. In this way, a software system may download the UI service package in advance, and preset the UI service package in the software system. Alternatively, when the software system is started, the UI service package is downloaded. Then, the software system may implement the function of the loading apparatus by using a UI service in the UI service package, and load a to-be-loaded UI service and a dependency of the to-be-loaded UI service by using the loading apparatus.

In addition, in addition to a UI service implementing the function of the loading apparatus, the UI service package implementing the function of the loading apparatus further includes a UI service related to the loading apparatus.

Type 3: Common Dependency UI Service Package

The common dependency UI service package may include at least one runtime dependency item. The at least one runtime dependency item may be referenced as a dependency by a UI service in UI service packages of the type 1, type 2, and type 3. That is, a UI service in another type of UI service package may reuse at least one runtime dependency item in the common dependency UI service package. Herein, the another type of UI service package may be the business UI service package or the UI service package implementing the function of the loading apparatus. This is not limited.

It should be noted that one common dependency UI service package may correspond to one loading apparatus, and one loading apparatus may correspond to a plurality of common dependency UI service packages. The common dependency UI service package may provide runtime dependencies for all UI services that can be loaded by the loading apparatus corresponding to the common dependency UI service package.

It should be understood that different IT service providers may generate the business UI service package, the UI service package implementing the function of the loading apparatus, and the common dependency UI service package at respective middle platforms based on respective domains of expertise by using the generation apparatus provided in embodiments of this application according to the UI service package generation method provided in embodiments of this application. Specifically, for a process in which the generation apparatus generates the business UI service package, the UI service package implementing the function of the loading apparatus, and the common dependency UI service package, refer to the following descriptions in S101 to S108. Details are not described herein.

It should be further noted that the software system may load at least one UI service in the business UI service package by using the loading apparatus implemented by using the UI service package implementing the function of the loading apparatus. After the at least one UI service is rendered by the software system, at least one UI may be obtained.

With reference to the accompanying drawings, the following describes a method for generating and registering a UI service package and loading a UI service provided in embodiments of this application.

Figure 8:
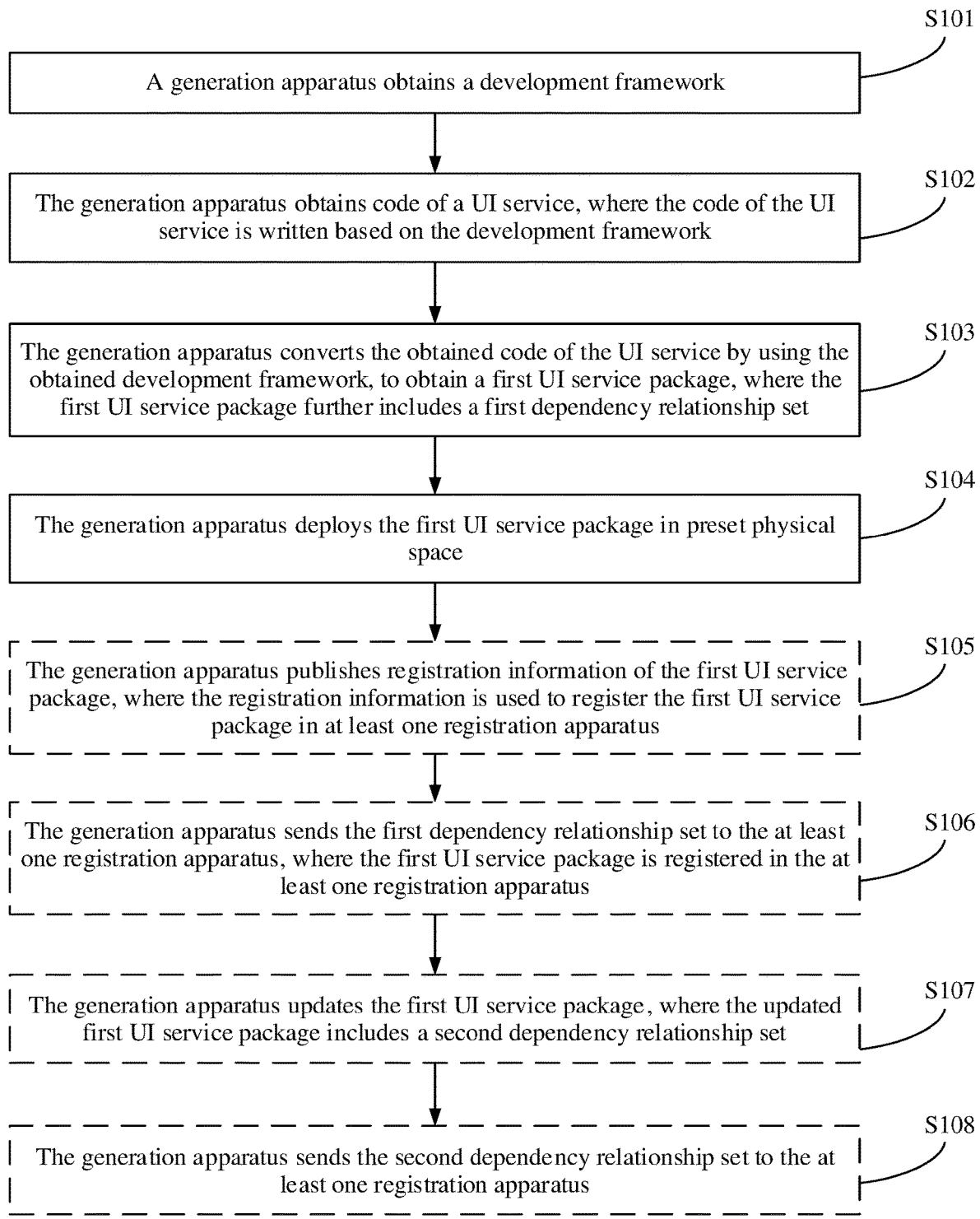
FIG. 8 is a schematic flowchart of a UI service package generation method according to an embodiment of this application.

FIG. 8 is a schematic flowchart of a UI service package generation method according to an embodiment of this application. The method is applied to a generation apparatus, and the method includes the following steps.

S101: The generation apparatus obtains a development framework.

S102: The generation apparatus obtains code of a UI service, where the code of the UI service is written based on the development framework.

The code of the UI service includes a reuse path, and the reuse path is used to indicate an access path of a dependency of the UI service.

S103: The generation apparatus converts the obtained code of the UI service by using the obtained development framework, to obtain a first UI service package. The first UI service package further includes a first dependency relationship set.

The first UI service package includes at least one UI service.

The first dependency relationship set includes a dependency relationship of at least one UI service in the first UI service package, and the dependency relationship is used to indicate a dependency of the at least one UI service.

S104: The generation apparatus deploys the first UI service package in preset physical space.

S105 (optional): The generation apparatus publishes registration information of the first UI service package, where the registration information is used to register the first UI service package in at least one registration apparatus.

S106 (optional): The generation apparatus sends the first dependency relationship set to the at least one registration apparatus, where the first UI service package is registered in the at least one registration apparatus.

S107 (optional): The generation apparatus updates the first UI service package, where the updated first UI service package includes a second dependency relationship set.

S108 (optional): The generation apparatus sends the second dependency relationship set to the at least one registration apparatus.

According to the UI service package generation method provided in this embodiment of this application, a UI service can be efficiently reused between different UI service packages by using a reuse path in reuse code.

Furthermore, according to the UI service package generation method provided in this embodiment of this application, the generation apparatus can obtain a UI service package based on a same development framework. When a UI application is obtained through integration by using a UI service in the UI service package, a threshold for subsequently integrating UI services by a developer can be lowered.

In addition, in the UI service package generation method provided in this embodiment of this application, the UI service package obtained by converting code by the development framework further includes dependency relationships (for example, the first dependency relationship set and the second dependency relationship set) of UI services in the UI service package. In this way, a loading apparatus can obtain, from a registration apparatus, dependency relationship sets of all UI service packages registered in the registration apparatus. In this way, the loading apparatus can determine reuse paths of all dependencies of a to-be-loaded UI service based on all the obtained dependency relationship sets, and further concurrently download the to-be-loaded UI service and a dependency of the to-be-loaded UI service based on reuse paths of the to-be-loaded UI service and the dependency of the to-be-loaded UI service, and sequentially load the to-be-loaded UI service and the dependency of the to-be-loaded UI service. This improves efficiency of loading the UI service, that is, improves running efficiency of the to-be-loaded UI service that reuses a UI service or a runtime dependency item.

The following describes steps S101 to S108 in detail.

In S101, the development framework obtained by the generation apparatus is used to convert code of a UI service into a UI service package. Herein, the code of the UI service may be code written in any computer high-level language applicable to the development framework.

The generation apparatus may obtain the development framework from a code repository based on a software package configuration file.

The software package configuration file is used to indicate that the UI service package into which the obtained development framework converts the code of the UI service does not include a runtime dependency referenced by the code. In other words, the obtained development framework in this embodiment of this application is a development framework of a develop-state dependency, and the development framework of the develop-state dependency is only used to convert the code of the UI service, to obtain the UI service package. The development framework of the develop-state dependency does not participate in running of the UI service package.

In addition, the development framework obtained in this embodiment of this application may be a development framework of a version. In this way, when obtaining the development framework, the generation apparatus can obtain a development framework of a latest version based on a version number of the development framework.

Specifically, the generation apparatus may obtain the development framework from the code repository based on the software package configuration file by using a code repository tool.

The code repository tool may be a node package manager (npm) tool, or the code repository tool may be an integrated development environment (IDE) plug-in or the like. This is not limited.

In a possible implementation, the npm tool may deliver an instruction to a processor of the generation apparatus by using a manually entered command line command, so that the processor of the generation apparatus obtains the development framework from the code repository after receiving the instruction.

For example, steps in which the generation apparatus obtains the development framework by using the npm tool may be as follows:

Step 1: Add a configuration item to an npm configuration file.

"devDependencies":{
"@turboui/turbo-ui-cli-service": "^3.0.0"
}

Step 2: Run a command: npm install.

Herein, "devDependencies" indicates that the to-be-obtained development framework is a development framework of a develop-state dependency, "@turboui/turbo-ui-cli-service" indicates a path for obtaining the development framework, and "3.0.0" indicates a version number of the to-be-obtained development framework.

In another possible implementation, the IDE plug-in may deliver an instruction to the processor of the generation apparatus through UI interaction, so that the processor of the generation apparatus obtains the development framework from the code repository after receiving the instruction.

In still another possible implementation, the IDE plug-in may use an instruction delivered through UI interaction as a command line command entered into the npm tool. Further, the npm tool delivers an instruction to the processor of the generation apparatus by using the command line command, so that the processor of the generation apparatus obtains the development framework from the code repository after receiving the instruction.

In S102, specifically, the code of the UI service obtained by the generation apparatus may be written by a developer based on the development framework obtained in step S101.

In this embodiment of this application, an example in which the code of the UI service includes code of m UI services is used, where m is a positive integer. Herein, the code of the m UI services may correspond to the m UI services, the m UI services include a first UI service, and the first UI service is any one of the m UI services. Code of the first UI service includes reuse code, the reuse code includes a reuse path, and the reuse path is used to indicate a dependency of the first UI service. The reuse path in the code of the first UI service meets at least one of the following conditions:

Condition 1: The reuse path is used to indicate that the dependency of the first UI service is a second UI service, and the second UI service is any UI service in a second UI service package.

Herein, the second UI service package may be any UI service package generated according to the UI service package generation method provided in this embodiment of this application, and the second UI service package is a UI service package different from the first UI service package. It can be learned that the first UI service reuses a UI service in the second UI service package by using the reuse code.

Condition 2: The reuse path is used to indicate that the dependency of the first UI service is a runtime dependency item, and the runtime dependency item is any runtime dependency item in a common dependency UI service package. Herein, the common dependency UI service package may include at least one runtime dependency item.

Specifically, the common dependency UI service package may be a common dependency UI service package generated based on code of at least one runtime dependency according to the UI service package generation method provided in this embodiment of this application. After the development framework converts the code of the at least one runtime dependency into the common dependency UI service package, the common dependency UI service package includes at least one runtime dependency item. One UI runtime dependency item corresponds to code of one runtime dependency.

It should be noted that the common dependency UI service package may be used to provide a dependency for a UI service in at least one UI service package registered in the registration apparatus. Herein, there is at least one registration apparatus. For related descriptions of the registration apparatus, refer to S201 to S204 below. Details are not described herein.

In this way, in the UI service package generation method provided in this embodiment of this application, the UI service in the first UI service package reuses at least one of a UI service in another UI service package and a runtime dependency item in the common dependency UI service package by using the reuse path in the reuse code, so that redundant code in the developed first UI service package is reduced.

The reuse path in the code of the first UI service is used to indicate an access path of the second UI service or the runtime dependency item, and the reuse path may be determined based on an initial reuse path of the second UI service. Herein, an initial reuse path of a UI service may include a name of a UI service package and a version number of the UI service package. Optionally, the initial reuse path of the UI service package may further include a name of the loading apparatus, an index directory name of the UI service in the UI service package, and a name of the UI service. For specific descriptions of the initial reuse path, refer to the following descriptions in S204. Details are not described herein.

It should be understood that if the UI service is a runtime dependency item, the initial reuse path includes a name of the runtime dependency item. This is because a common dependency UI service package including a runtime dependency item is usually deployed on a globally unique UI service package at a preset network address, and the preset network address is the default for the loading apparatus. "Globally" means all UI service packages registered in a registration apparatus corresponding to the loading apparatus. For a correspondence between the loading apparatus and the registration apparatus, refer to the following descriptions in S103. Details are not described herein.

During actual application, a developer may determine a reuse path of the UI service in reuse code based on the initial reuse path of the UI service. The reuse path of the UI service may include the name of the UI service package and the version number of the UI service package. Optionally, the reuse path may further include the name of the loading apparatus, the index directory name of the UI service in the UI service package, and the name of the UI service. The version number of the UI service package may be a fuzzy version number. If the UI service is a runtime dependency item, the reuse path is the same as the initial path, that is, the name of the runtime dependency item.

The name of the loading apparatus, the name of the UI service package, the index directory name of the UI service in the UI service package, and the name of the UI service in the reuse path are the name of the loading apparatus, the name of the UI service package, the index directory name of the UI service in the UI service package, and the name of the UI service in the initial reuse path, are not described herein again.

The fuzzy version number of the UI service package in the reuse path of the UI service is used to indicate a UI service package that meets a preset version condition. If a version number of the UI service package is represented by m digits, the preset condition may be that first n digits of the version number of the UI service package are the same. In this case, the last m−n digits in the fuzzy version number of the UI service package may be represented by "x", where "x" indicates that the last m−n digits in the version number of the UI service package are to be determined, m and n are both positive integers, and m>n.

For example, if a version number in the initial reuse path of the UI service is 1.1.3, m is 3. If n is 2, a fuzzy version number of a UI service package that meets the preset version condition is 1.1.x, and 1.1.x is used to indicate all UI service packages whose version includes the first two digits 1. If n is 1, a fuzzy version number of a UI service package that meets the preset condition is 1.x.x, and 1.x.x is used to indicate all UI service packages whose version includes the first digit 1.

In this way, when loading and reusing a UI service (for example, the second UI service) in a UI service package, the loading apparatus may download the reused UI service from the second UI service package of the latest version based on a fuzzy version number of the second UI service package in a reuse path of the second UI service. For a process in which the loading apparatus downloads the reused UI service from the second UI service package of the latest version, refer to the following descriptions in S303. Details are not described herein.

Specifically, the reuse code may be implemented in a form of referencing a reuse path by using a keyword.

A standard format of the reuse path may be "$name of a loading apparatus/name of a UI service package@version number of the UI service package/index directory name of a UI service in the UI service package/name of the UI service".

The "name of the loading apparatus" may be left blank. If the "name of the loading apparatus" is left blank, it indicates a current loading apparatus by default. The "index directory name of the UI service in the UI service package" can be left blank. If the "index directory name of the UI service in the UI service package" is left blank, the UI service package has only one index directory. The "name of the UI service" can be left blank. If the "name of the UI service" is left blank, it indicates that an entry of the UI service is a default entry (for example, a default application programming interface (API)).

In a possible implementation, the reuse code may be implemented in a form of referencing a reuse path by using an import keyword, or the reuse code may be implemented in a form of referencing a reuse path by using an import key function. Here, both the import keyword and the import key function comply with the ecmascript (ES) standard defined in the ECMA-262 standard.

In this implementation, after a UI service corresponding to the reuse path is loaded by a loading apparatus in a software system, a rendering mode used by the software system is a virtual UI object rendering mode.

For example, the reuse code may be as follows:
import cpqcpartlist from "$/test-component@1.0.x";
import {test1} from "$/test-component@1.0.x/package1";
herein, import"" is a format of the import keyword. "$/test-component@1.0.x" indicates the reuse path, where the reuse path includes a name "test-component" of the UI service package and a fuzzy version number "1.0.x" of the UI service package.

For another example, the reuse code may be as follows:
( )=>import("$/test-component@1.0.x/turbovuep");
herein, ( )=>import (" ") is a format of the import key function, and "$/test-component@1.0.x/turbovuep" indicates the reuse path, where the reuse path includes a name "test-component" of the UI service package, a fuzzy version number "1.0.x" of the UI service package, and a name "turbovuep" of the UI service.

In another possible implementation, in a software system that executes a non-ES standard, the reuse code may be implemented in a form of referencing a reuse path by using a $turbo keyword.

Optionally, the reuse code may be implemented in a form of referencing a reuse path by using a $turbo keyword.

In this implementation, after a UI service corresponding to the reuse path is loaded by a loading apparatus in a software system, a used rendering mode is a combined rendering mode in a real UI rendering mode. In addition, the software system inserts and displays, on a UI currently displayed by the software system, a UI obtained through rendering based on the UI service corresponding to the reuse path.

It may be understood that the software system inserts and displays the UI in the UI currently displayed by the software system, which changes a layout, a page, a space, or the like of the UI originally displayed by the software system.

For example, the reuse code may be as follows:
const component=await $turbo("#container", "$/test-component@1.0.x", options); herein, $turbo( ) indicates a format of the $turbo keyword, and "$/test-component@1.0.x" indicates the reuse path.

Optionally, the reuse code may be implemented in a form of referencing a reuse path by using a $turbo.iframe keyword.

In this implementation, after a UI service corresponding to the reuse path is loaded by a loading apparatus in a software system, a used rendering mode is a floating framework mode in a real UI rendering mode. In addition, the software system superimposes and displays, on a UI currently displayed by the software system, a UI obtained through rendering based on the UI service corresponding to the reuse path.

It may be understood that before the software system superimposes and displays the UI on the UI currently displayed by the software system, a layout, a page, a space, or the like of the UI originally displayed by the software system does not change.

For example, the reuse code may be as follows:
const component=await $turbo.iframe("#container", "$/test-component@1.0.x", options);
herein, $turbo.iframe ( ) indicates a format of the keyword, and $/test-component@1.0.x indicates the reuse path.

Optionally, the reuse code may be implemented in a form of referencing a reuse path by using a $turbo.vue keyword.

In this implementation, after a UI service corresponding to the reuse path is loaded by a loading apparatus in a software system, a used rendering mode is a virtual UI object rendering mode.

For example, the reuse code may be as follows:
TestComponent: ( )=>$turbo.vue("$/test-component@1.0.x", vue);
herein, "$turbo.vue ( )" indicates a format of the keyword, "$/test-component@1.0.x" indicates the reuse path, "vue" is a variable that indicates an object, and "vue" is an optional parameter and can be set or left blank. If "vue" is left blank, it indicates a vue object in the current loading apparatus. If "vue" is set, it indicates a vue object in the current software system.

Optionally, the reuse code may be implemented in a form of referencing a reuse path by using a $turbo.react keyword.

In this implementation, after a UI service corresponding to the reuse path is loaded by a loading apparatus in a software system, a used rendering mode is a virtual UI object rendering mode.

For example, the reuse code may be as follows:
TestComponent: ( )=>$turbo.react("$/test-component@1.0.x", react);
herein, "$turbo.react ( )" indicates a format of the keyword, "$/test-component@1.0.x" indicates the reuse path, "react" is a variable that indicates an object, and "react" is an optional parameter and can be set or left blank. If "react" is left blank, it indicates a react object in the current loading apparatus. If "react" is set, it indicates a react object in the current software system.

In addition, in the UI service package generation method provided in this embodiment of this application, the UI service in the first UI service package may reuse the UI service in the second UI service package. When a type of the first UI service package is a business UI service package, after the first UI service package is generated, a UI service in the first UI service package may also be reused by a UI service in at least one other UI service package.

Optionally, all UI services in the first UI service package may be reused by a UI service in at least one other UI service package.

Optionally, some UI services in the first UI service package may be reused by a UI service in at least one other UI service package.

During specific implementation, the generation apparatus may export, based on an entry file and by using a keyword, a list of reusable UI services in a code file including the code of the m UI services. The list may be used as a configuration file of the first UI service package. According to this design, a developer can reuse a reusable UI service in the first UI service package according to a development requirement when subsequently writing code.

The entry file may be an index.ts file, and the keyword may be an export keyword. For example, based on the entry file index.ts, code for exporting a reusable UI service by using the export keyword may be as follows:
packages>test-component>src>ts index.ts
1 export {default} from "components/cpart-list/index.vue";
2 export {default as networktest} from "components/netw-test.vue"
3 export {default as testapp} from "app/index.vue";
herein, code marked with 1 to 3 indicates three exported UI services. "default" indicates that an entry of a to-be-exported UI service is a default entry, "default as networktest" indicates that a name of an entry of a to-be-exported UI service is "networktest", "default as testapp" indicates that a name of an entry of a to-be-exported UI service is "testapp", and "components/cpart-list/index.vue", "components/netw-test.vue", and "app/index.vue" indicate code paths of the to-be-exported UI services in the UI service package including the UI services.

It may be understood that the generation apparatus may first obtain the development framework, and then receive, through an input/output interface, the code that is of the m UI services and that is entered by a developer. The code of the m UI services is written based on the development framework obtained by the generation apparatus. In this case, the generation apparatus may first perform S101, and then perform S102.

Certainly, the generation apparatus may also obtain the code of the m UI services from another device. The code of the m UI services is code that is of the m UI services, that is entered by a developer, that is received by the another device through an input/output interface after the another device obtains the development framework. The code of the m UI services is written based on the development framework obtained by the another device. In this case, the generation apparatus may first perform S102, and then perform S101.

It may be understood that, if the UI service package to be generated by the generation apparatus is a common dependency UI service package, the code of the m UI services may be code of m runtime dependencies. After the code of the m runtime dependencies is converted by the development framework obtained in step S101, the common dependency UI service package may be obtained.

In the code of the m runtime dependencies, code at least one runtime dependency may be associated with driver code. Herein, the driver code is used to implement a function of a driver. After the generation apparatus generates the common dependency UI service package based on the code of the m runtime dependencies, at least one runtime dependency item corresponding to the code the at least one runtime dependency item associated with the driver code may be associated with a driver implemented by the driver code, and the driver is configured to initialize the runtime dependency item.

In S103, the first UI service package obtained by converting the code of the m UI services by using the obtained development framework may be any one of a business UI service package, a UI service package implementing a function of the loading apparatus, or a common dependency UI service package.

Specifically, the generation apparatus may convert, based on a first configuration file (corresponding to the preset configuration file in this embodiment of this application) by using the development framework obtained in step S101, the code of the m UI services obtained in step S102, to obtain the first UI service package. The first UI service package includes the m UI services and the first dependency relationship set.

The first configuration file may be preconfigured by the generation apparatus according to a standard of a development framework, or may be obtained by the generation apparatus from another device in advance. This is not limited.

The first configuration file is used to indicate a type of the first UI service package, and the type is used to indicate a use of the first UI service package. For example, the first UI service package may be any one of the business UI service package, the UI service package implementing a function of the loading apparatus, or the common dependency UI service package.

For example, in the first configuration file, "portal" may be used to indicate the UI service package implementing a function of the loading apparatus, "component" may be used to indicate the business UI service package, and "runtime" may be used to indicate the common dependency UI service package. In this way, when the first configuration file includes "portal", the first UI service package generated by the generation apparatus based on the first configuration file is a UI service package implementing a function of the loading apparatus.

When the first configuration file includes "component", the first UI service package generated by the generation apparatus based on the first configuration file is a business UI service package. When the first configuration file includes "runtime", the first UI service package generated by the generation apparatus based on the first configuration file is a common dependency UI service package.

When the first configuration file indicates that the type of the first UI service package is a UI service package implementing a function of the loading apparatus, the generation apparatus is further preconfigured with a second configuration file.

In this case, the generation apparatus may convert, based on the first configuration file by using the development framework obtained in step S101, the code of the m UI services obtained in step S102, to obtain the first UI service package, where the first UI service package further includes the second configuration file. The first UI service package is a UI service package implementing a function of the loading apparatus.

The second configuration file includes a network address of at least one registration apparatus. In this way, the loading apparatus implemented by the first UI service package corresponds to the registration apparatus corresponding to the network address of the at least one registration apparatus. In addition, the loading apparatus may communicate with the at least one registration apparatus, and load UI services in all UI service packages registered in the at least one registration apparatus.

It can be learned that one loading apparatus may correspond to at least one registration apparatus. It should be noted that one registration apparatus may also correspond to at least one loading apparatus. In other words, a network address of a registration apparatus may be configured in a second configuration file used to generate UI service packages implementing functions of different loading apparatuses.

Herein, for related descriptions of the registration apparatus, refer to S201 to S204 below. Details are not described herein.

Specifically, the development framework may obtain the first UI service package in any one of the following implementations:

In a possible implementation, the development framework may convert the code of the m UI services into code of another type different from the current code type based on the first configuration file, to obtain the UI service package. It should be understood that the another type of code may be recognized by the software system.

In a possible implementation, the development framework may compile the code of the m UI services into the first UI service package based on the first configuration file. Compilation is a process of converting a high-level computer language into a binary language that can be recognized by a computer.

The first dependency relationship set may be a first dependency relationship set obtained by performing dependency detection analysis on reuse code in the code of the m UI services when the development framework obtained in step S101 converts the code of the m UI services. The development framework further packs the first dependency relationship set in the first UI service package.

It should be noted that the first dependency relationship set may include a dependency relationship of at least one UI service in the first UI service package, and the dependency relationship is used to indicate a dependency of the at least one UI service. In the following description of this embodiment of this application, an example in which the first dependency relationship set includes a dependency relationship of each UI service in the first UI service package is used for description.

Specifically, the generation apparatus may detect a keyword in the code of the m UI services in full text, to determine reuse paths in the code of the m UI services. A reuse path is used to indicate an access path of a dependency of a UI service whose code includes the reuse path. Then, the generation apparatus determines, based on the determined reuse path, the dependency of the UI service whose code includes the reuse path.

For related descriptions of the reuse path, refer to the foregoing descriptions of the reuse path in S102. Details are not described herein again.

Specifically, the first dependency relationship set includes m dependency relationships, and each of the m dependency relationships is used to indicate a dependency of each of the m UI services in the first UI service package.

For example, a dependency relationship of the first UI service is used to indicate a dependency of the first UI service. The dependency of the first UI service may be at least one of a runtime dependency item and a UI service that is different from the first UI service. Herein, the UI service different from the first UI service may be a UI service in the first UI service package, or may be a UI service in another UI service package (for example, the second UI service package) different from the first UI service package. This is not limited.

For example, if the first UI service package includes a UI service 1 and a UI service 2, a dependency of the UI service 1 may be a UI service 3, and a dependency of the UI service 2 may be a UI service 4 and a runtime dependency item 1. Herein, the UI service 3 and the UI service 4 may be UI services in the first UI service package, or may be UI services in another UI service package (for example, the second UI service package) different from the first UI service package.

The first dependency relationship set may be embodied in a form of a table. Certainly, the first dependency relationship set may also be embodied in any form in which a dependency relationship of a UI service can be described. This is not limited.

Refer to Table 1. Table 1 shows the first dependency relationship set in a form of a table. As shown in Table 1, the first dependency relationship set includes two dependency relationships, and the two dependency relationships include a dependency relationship of the UI service 1 and a dependency relationship of the UI service 2.

The dependency relationship of the UI service 1 indicates that the dependency of the UI service 1 includes the UI service 3, and the dependency relationship of the UI service 2 indicates that the dependency of the UI service 2 includes the UI service 4 and the runtime dependency item 1.

TABLE 1

| Dependency relationship number | UI service | Dependency |
| --- | --- | --- |
| 1 | UI service 1 | UI service 3 |
| 2 | UI service 2 | UI service 4 Runtime dependency item 1 |

In S104, the generation apparatus may deploy, based on a preset network address, the first UI service package obtained in step S103 in physical space corresponding to the preset network address.

Specifically, the generation apparatus may send or upload, through the communications interface shown in FIG. 4, the first UI service package to the physical space corresponding to the network address.

In S105, the registration information of the first UI service package includes a name of the first UI service package and a network address used to deploy the first UI service package.

Specifically, the generation apparatus may publish the registration information of the first UI service package through the communications interface shown in FIG. 4. The registration information is used to register the first UI service package in the at least one registration apparatus.

Optionally, the registration information may further include a version number of the first UI service package.

Optionally, the generation apparatus may send the registration information of the first UI service package to the at least one registration apparatus, so that the at least one registration apparatus adds the registration information of the first UI service package to a registration list of the at least one registration apparatus.

Optionally, the generation apparatus may publish the registration information of the first UI service package on the third-party platform shown in FIG. 3. In this way, the at least one registration apparatus can obtain the registration information of the first UI service package from the third-party platform, and add the registration information of the first UI service package to a registration list of the at least one registration apparatus. This is not limited.

In S106, the generation apparatus may send, to the at least one registration apparatus through the communications interface shown in FIG. 4, the first dependency relationship set in the first UI service package obtained in step S103.

In this way, after the first UI service package is registered in the at least one registration apparatus, the at least one registration apparatus obtains the first dependency relationship set by receiving the first dependency relationship set.

In S107, during actual application, the first UI service package may be updated at any time. For a process of updating the first UI service package, refer to the process of S101 to S104. Details are not described herein again.

It may be understood that the updated first UI service package may include the second dependency relationship set, and the second dependency relationship set includes a dependency relationship of at least one UI service in the updated first UI service package.

For example, if any UI service in the updated first UI service package is a third UI service, a dependency relationship of the third UI service is used to indicate a dependency of the third UI service.

It may be understood that, after the generation apparatus updates the first UI service package, a name, a version number, and a network address of the updated UI service package are not changed. In this case, the generation apparatus performs step S108 to send the second dependency relationship set to the at least one registration apparatus, so that the at least one registration apparatus updates the first dependency relationship set to the second dependency relationship set.

After the generation apparatus updates the first UI service package, at least one of a name or a version number of the updated UI service package, or a network address used to deploy the updated UI service package changes. For example, the version number is updated. In this case, the generation apparatus publishes registration information of the updated first UI service package, where the registration information includes a name of the updated first UI service package and a network address used to deploy the updated first UI service package. The registration information is used to register the updated first UI service package in the at least one registration apparatus.

Optionally, the registration information of the updated first UI service package may further include a version number of the updated first UI service package.

The foregoing describes the UI service package generation method provided in this embodiment of this application. According to the method, a UI service can be efficiently reused between different UI service packages by using a reuse path in reuse code.

Furthermore, according to the method, the generation apparatus can obtain a UI service package based on a same development framework. When a UI application is obtained through integration by using a UI service in the UI service package, a threshold for subsequently integrating UI services by a developer can be lowered.

In addition, in the UI service package generation method provided in this embodiment of this application, the UI service package obtained by converting code by the development framework further includes dependency relationships (for example, the first dependency relationship set and the second dependency relationship set) of UI services in the UI service package. In this way, the loading apparatus can obtain, from the registration apparatus, dependency relationship sets of all UI service packages registered in the registration apparatus. In this way, the loading apparatus can determine reuse paths of all dependencies of a to-be-loaded UI service based on all the obtained dependency relationship sets, and further concurrently download the to-be-loaded UI service and the dependency of the to-be-loaded UI service based on reuse paths of the to-be-loaded UI service and the dependency of the to-be-loaded UI service, and load the to-be-loaded UI service and the dependency of the to-be-loaded UI service. This improves efficiency of loading the UI service, that is, improves running efficiency of the to-be-loaded UI service that reuses a UI service or a runtime dependency item.

The following describes a UI service package registration method provided in an embodiment of this application.

Figure 9:
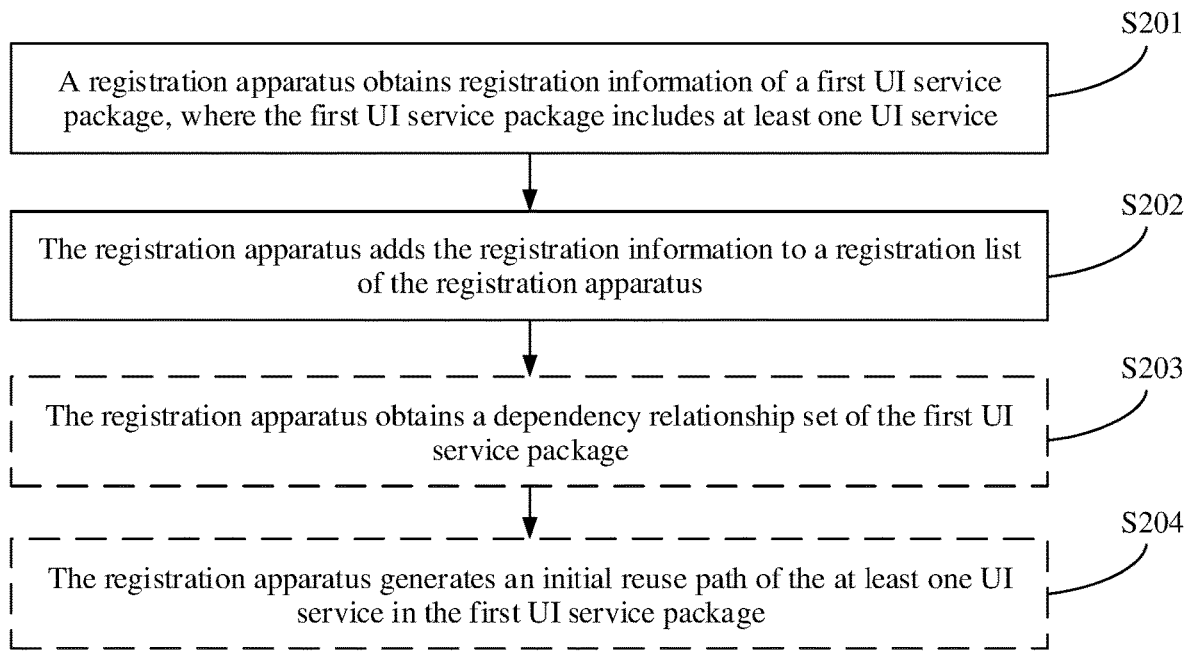
FIG. 9 is a schematic flowchart of a UI service package registration method according to an embodiment of this application.

FIG. 9 is a schematic flowchart of a UI service package registration method according to an embodiment of this application. The method is applied to a registration apparatus, and the method includes the following steps.

S201: The registration apparatus obtains registration information of a first UI service package, where the first UI service package includes at least one UI service.

The registration information of the first UI service package includes a name of the first UI service package and a network address used to deploy the first UI service package. Herein, the first UI service package may be the first UI service package obtained by performing steps S101 to S103.

Optionally, the registration information may further include a version number of the first UI service package.

In a possible implementation, the registration apparatus may receive, through the communications interface shown in FIG. 4, the registration information that is of the first UI service package and that is sent by a generation apparatus.

In another possible implementation, the registration apparatus may obtain the registration information of the first UI service package from a third-party platform. The generation apparatus publishes the registration information of the first UI service package on the third-party platform in advance. The third-party platform may be a common service platform or the like. This is not limited.

In still another possible implementation, a developer may enter (or import) the registration information of the first UI service package to the registration apparatus through an input/output interface of the registration apparatus. Correspondingly, the registration apparatus may obtain the registration information. This is not limited.

Optionally, the registration apparatus may send a request for obtaining the registration information to the third-party platform. In response, the third-party platform sends the registration information of the first UI service package to the registration apparatus. In this way, the registration apparatus can obtain the registration information of the first UI service package.

S202: The registration apparatus adds the registration information to a registration list of the registration apparatus.

Specifically, the registration apparatus adds the obtained registration information of the first UI service package to the registration list of the registration apparatus. In this way, the first UI service package is registered in the registration apparatus.

The registration list of the registration apparatus includes registration information of at least one UI service package. The at least one UI service package may be a business UI service package, a UI service package implementing a function of a loading apparatus, or a common dependency UI service package. This is not limited.

For example, code used to add the registration information of the first UI service package to the registration list may be as follows:

```
{
  "name": "acc-component",
  "version": "1.0.0",
  "rootUrl": "//r-beta.hw3static.com/s/acc-uiaas/lst"
}
``` herein, "name" indicates that an information type is a name of a UI service package, "acc-component" indicates the name of the first UI service package, "version" indicates that an information type is a version number of a UI service package, "1.0.0" indicates the version number of the first UI service package, "rootUrl" indicates that an information type is a network address used to deploy a UI service package, and "//r-beta.hw3static.com/s/acc-uiaas/lst" indicates the network address used to deploy the first UI service package.

S203 (optional): The registration apparatus obtains a dependency relationship set of the first UI service package.

For descriptions of the dependency relationship set of the first UI service package, refer to the related descriptions of the first dependency relationship set in S103. Details are not described herein again.

It may be understood that, if the registration apparatus obtains the dependency relationship set (for example, the first dependency relationship set described in step S103) of the first UI service package for the first time, the registration apparatus may store the dependency relationship set. It should be understood that the dependency relationship set corresponds to the registration information of the first UI service package in the registration list.

Optionally, the registration apparatus may add the obtained dependency relationship set, as registration information of the first UI service package, to the registration list, so that the dependency relationship set corresponds to the registration information of the first UI service package in the registration list.

If it is not the first time that the registration apparatus obtains the dependency relationship set of the first UI service package, the registration apparatus updates an originally stored dependency relationship set.

For example, the registration apparatus replaces the originally stored dependency relationship set (for example, the first dependency relationship set described in step S103) with a newly obtained dependency relationship set (for example, the second dependency relationship set described in step S107).

Specifically, the registration apparatus may obtain the dependency relationship set of the first UI service package in any one of the following possible implementations.

In a possible implementation, the registration apparatus receives the dependency relationship set that is of the first UI service package and that is sent by the generation apparatus.

It should be understood that the dependency relationship set received by the registration apparatus for the first time may be received when the registration information of the first UI service package is received from the generation apparatus. Herein, the dependency relationship set and the registration information may be received by the registration apparatus as one piece of information (for example, the registration information includes the first dependency relationship set). Certainly, the dependency relationship set and the registration information may also be received by the registration apparatus as two pieces of information. This is not limited.

In another possible implementation, the registration apparatus may obtain the dependency relationship set of the first UI service package from the first UI service package based on the network address that is in the registration information of the first UI service package and that is used to deploy the first UI service package.

Specifically, the registration apparatus may obtain, based on the network address, the dependency relationship set of the first UI service package from physical space corresponding to the network address.

The first UI service package may be updated at any time. Therefore, the dependency relationship set of the first UI service package deployed at the network address may be different at different moments. In this case, the registration apparatus may periodically obtain, based on the network address, the dependency relationship set of the first UI service package from the physical space corresponding to the network address.

It is easy to understand that a process in which the registration apparatus obtains the first dependency relationship set from the first UI service package based on the network address that is in the registration information of the first UI service package and that is used to deploy the first UI service package may be considered as a process in which the registration apparatus discovers a dependency of a UI service in the first UI service package based on the network address. In this way, according to the UI service package registration method provided in this application, the registration apparatus can automatically discover a dependency relationship of a UI service in the first UI service package.

That is, the registration apparatus can automatically discover a dependency relationship of each UI service in each UI service package registered in the registration apparatus. In this way, when a loading apparatus corresponding to the registration apparatus loads a UI service, all to-be-loaded UI services and dependencies of the to-be-loaded UI services may be determined based on a dependency of each UI service in each UI service package registered in the registration apparatus, and all the UI services and the dependencies of the UI services are loaded, to improve a loading speed.

For example, code of the first dependency relationship set in the first UI service package that is obtained by the registration apparatus based on the network address used to deploy the first UI service package may be as follows:

```
"dep": [
    "@aurora/ui".
    "$/test-component@1.0.x"
],
``` herein, "dep" indicates that an information type is a dependency, the content in square brackets "[ ]" indicates a reuse path of a dependency, "$/test-component@1.0.x" indicates a reuse path of a UI service, and "@aurora/ui" indicates a reuse path of a runtime dependency item. This is not limited.

In still another possible implementation, a developer may enter (or import) the dependency relationship set of the first UI service package to the registration apparatus through the input/output interface of the registration apparatus. Correspondingly, the registration apparatus may obtain the dependency relationship set. This is not limited.

Optionally, the registration apparatus may further generate an initial dependency graph based on the obtained dependency relationship set (which includes, for example, a dependency relationship set 1 of a UI service package 1 and a dependency relationship set 2 of a UI service package 2) of the at least one UI service package (for example, the UI service package 1 and the UI service package 2) registered in the registration apparatus. The initial dependency graph includes dependency relationships included in the dependency relationship set 1 and the dependency relationship set 2, and further includes an association relationship between the dependency relationship set 1 and the dependency relationship set 2.

For detailed descriptions of the initial dependency graph, refer to the descriptions of the dependency graph in S302 below. Details are not described herein.

S204 (optional): The registration apparatus generates an initial reuse path of the at least one UI service in the first UI service package.

Specifically, the registration apparatus may generate the initial reuse path of the at least one UI service in the first UI service package based on the registration information of the first UI service package. The registration information of the first UI service package includes the name of the first UI service package, the network address used to deploy the first UI service package, and the version number of the first UI service package.

It may be understood that, if the registration information of the first UI service package does not include the version number of the first UI service package, the registration apparatus may obtain the version number of the first UI service package by using the network address used to deploy the first UI service package. In this case, the registration apparatus may generate the initial reuse path of the at least one UI service in the first UI service package based on the registration information of the first UI service package and the version number of the first UI service package.

In this way, when developing and writing code of a new UI service, a developer may determine, based on an initial reuse path of a reusable UI service in the first UI service package, a reuse path for reusing the UI service. Both the initial reuse path and the reuse path are used to indicate an access path of the at least one UI service. The reuse path includes a fuzzy version number of the first UI service package.

For related descriptions of the fuzzy version number of the first UI service package, refer to the related descriptions of the fuzzy version number of the UI service package in S102. Details are not described herein again.

Herein, an initial reuse path of a UI service may include a name of a UI service package and a version number of the UI service package. Optionally, the initial reuse path of the UI service may further include a name of a loading apparatus, a name of an index directory of the UI service in the UI service package, and a name of the UI service.

A UI service package that implements a function of a loading apparatus and that is generated by the generation apparatus includes a second configuration file, and a network address of at least one registration apparatus is configured in the second configuration file. Therefore, the name of the loading apparatus may be a name of a loading apparatus configured with the network address of the registration apparatus.

The name of the UI service package and the version number of the UI service package are the name of the UI service package including the UI service and the version number of the UI service package, that is, the name of the UI service package and the version number of the UI service package in registration information of the UI service package including the UI service.

The index directory name of the UI service in the UI service package may be used to indicate a set name (or combination name) of a set of different UI services in the UI service package. One UI service set includes at least one UI service. If a UI service package includes m UI services, the m UI services may be grouped into at least one UI service set.

For example, UI services in a UI service set may be UI services of a same interface type. A basis for grouping of different UI service sets is not limited in this application.

The name of the UI service indicates an entry of the UI service. For example, the entry may be an API.

Similarly, the registration apparatus may also generate an initial reuse path of at least one runtime dependency item in a common dependency UI service package based on registration information of the common dependency UI service package. Details are not described herein again.

In this way, a developer can determine, by using the initial reuse path of the UI service or the runtime dependency item, a reuse path of the UI service or the runtime dependency item. In this way, when generating a UI service package that reuses the UI service or the runtime dependency item, the generation apparatus can obtain the dependency relationship of the UI service in the first UI service package through analysis based on the reuse path.

Further, the loading apparatus may download and load the reused UI service or runtime dependency item based on the dependency relationship and the reuse path.

Optionally, the registration apparatus may publish the generated initial reuse path of the at least one UI service in the first UI service package on a common services platform. In this way, when developing a new UI service package, a developer can determine, based on an initial reuse path of a reusable UI service in the first UI service package, a reuse path for reusing the UI service, so that UI services in different UI service packages can be reused by each other.

Certainly, the registration apparatus may also publish, on the common service platform, the initial reuse path of the at least one runtime dependency item in the common dependency UI service package registered in the registration apparatus. In this way, when developing a new UI service package, a developer can determine, based on the initial reuse path of the at least one runtime dependency item, a reuse path for reusing the at least one runtime dependency item.

In this way, according to the UI service package registration method provided in this embodiment of this application, the first UI service package can be registered in the registration apparatus. The registration apparatus may further obtain the dependency relationship (for example, the first dependency relationship set) of the at least one UI service in the first UI service package. In this way, the loading apparatus can obtain, from the registration apparatus, dependency relationship sets of all UI service packages registered in the registration apparatus.

In this way, the loading apparatus can determine reuse paths of all dependencies of a to-be-loaded UI service based on all the obtained dependency relationship sets, and further concurrently download the to-be-loaded UI service and a dependency of the to-be-loaded UI service based on reuse paths of the to-be-loaded UI service and the dependency of the to-be-loaded UI service, and load the to-be-loaded UI service and the dependency of the to-be-loaded UI service. This improves efficiency of loading the UI service, that is, improves running efficiency of the to-be-loaded UI service that reuses a UI service or a runtime dependency item.

It should be noted that the UI service package registration method may also be performed by the loading apparatus provided in this embodiment of this application. In this case, the loading apparatus and the registration apparatus are a same apparatus. This is not limited.

It may be understood that the foregoing method processes of generating a UI service package and registering a UI service package are both develop-state processes of the UI service. Herein, the development state process represents the method process of developing the UI service. The following describes a runtime state process of the UI service. Herein, the runtime state process represents a method process of running a UI service (or a method process of loading a UI service).

Figure 10:
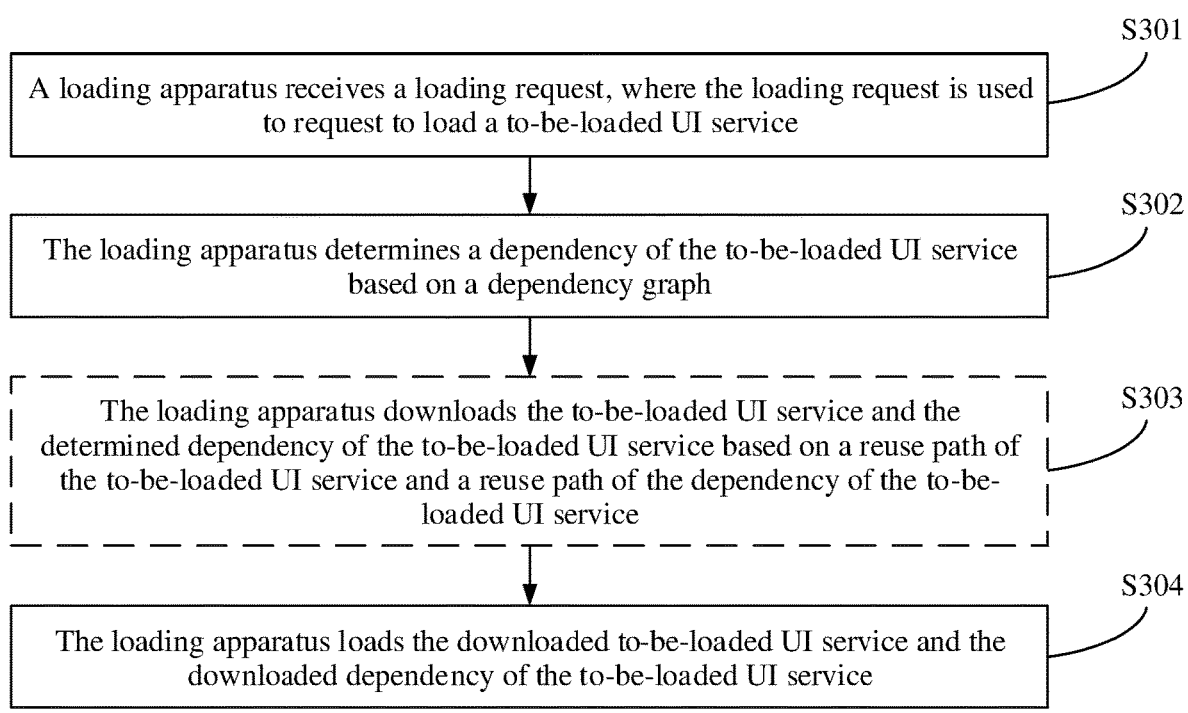
FIG. 10 is a schematic flowchart of a UI service loading method according to an embodiment of this application.

FIG. 10 is a schematic flowchart of a UI service loading method according to an embodiment of this application. The method is applied to a loading apparatus.

Herein, the loading apparatus is configured to load a UI service for a software system. The loading apparatus includes a dependency graph. The dependency graph indicates a dependency of at least one UI service in at least one UI service package, and indicates a UI service that references any UI service in the at least one UI service package as a dependency. The at least one UI service package is a UI service package registered in at least one registration apparatus. Herein, the at least one registration apparatus may be a registration apparatus corresponding to a network address that is of a registration apparatus and that is configured by a generation apparatus in a second configuration file.

As shown in FIG. 10, the UI service loading method includes the following steps.

S301: The loading apparatus receives a loading request, where the loading request is used to request to load a to-be-loaded UI service.

Specifically, the loading apparatus may receive a loading request sent by the software system. The loading request is used to request to load the to-be-loaded UI service. The loading request may include a reuse path used to indicate the to-be-loaded UI service.

For descriptions of the reuse path, refer to the foregoing descriptions of the reuse path in S102. Details are not described herein again.

The to-be-loaded UI service may include at least one UI service. When the to-be-loaded UI service includes a plurality of UI services, the loading request may include a reuse path used to indicate each of the plurality of UI services.

Herein, after the loading apparatus loads the to-be-loaded UI service, the software system may render the loaded to-be-loaded UI service into at least one UI. The at least one UI may be a UI in a tool UI application built based on the UI service package in this embodiment of this application, or may be a UI in a scenario-based UI application built based on the UI service package in this embodiment of this application. This is not limited.

During actual application, the software system may receive a request for loading a UI that is entered by a user through an input/output interface (for example, a keyboard, a mouse, or a touchscreen of the terminal device shown in FIG. 6). Herein, the UI may be a UI in any UI application. Then, the software system starts the loading apparatus, and sends the loading request to the loading apparatus. The loading request is used to request to load the to-be-loaded UI service. After the to-be-loaded UI service is rendered by the software system, the UI that the user requests to load may be obtained.

For example, the software system is a browser. The user may enter a network address in an address bar of the browser (or the user clicks an icon or a button on the browser, and the browser automatically imports a network address). In this way, the browser receives a request of the user for loading a UI. For example, the UI may be a home page of the browser. Then, the browser starts the loading apparatus, and sends a loading request to the loading apparatus. The loading request is used to request to load a to-be-loaded UI service. After the to-be-loaded UI service is rendered by the browser, a home page UI of the browser may be obtained.

Optionally, after receiving the request of the user for loading a UI, the software system may start at least one preconfigured loading apparatus.

Optionally, after receiving the request of the user for loading a UI, the software system may download at least one loading apparatus. Then, the software system starts the at least one loading apparatus.

For example, the software system may download the at least one loading apparatus (for example, download a first loading apparatus and a second loading apparatus) by using an entry file or a bridge. For example, the software system is the browser. Code for the browser to download the two loading apparatuses by using the entry file is as follows:

<script type="text/javascript"src="http://kweweb-rhs1.huawei.com/isales/index/loader.js?ns=isales"></script>
<script type="text/javascript"src="http://kweweb-rhs1.huawei.com/isales/cpq/index/loader.js?ns=cpq"></script> herein, "http://kweweb-rhs1.huawei.com/isales/index/loader.js?ns=isales" indicates a network address of the first loading apparatus, "isales" indicates a name of the first loading apparatus, "http://kweweb-rhs1.huawei.com/isales/cpq/index/loader.js?ns=cpq" indicates a network address of the second loading apparatus, and "cpq" indicates a name of the second loading apparatus.

It should be noted that the network address of the first loading apparatus may be a network address used to deploy a UI service package implementing a function of the first loading apparatus, and the network address of the second loading apparatus may be a network address used to deploy a UI service package implementing a function of the second loading apparatus. The network address of the first loading apparatus and the network address of the second loading apparatus may be configured in the browser by a developer.

In this case, code of the software system further includes code used to indicate the first loading apparatus and the second loading apparatus to load a UI service. The code may be as follows:

$turbo.$isales("$/test-component@1.0.x")
$turbo.$cpq("$/test-component@1.0.x")

herein, the code "$turbo.$isales("$/test-component@1.0.x")" indicates that the first loading apparatus "isales" may be configured to load a UI service indicated by a reuse path "$/test-component@1.0.x", and the code "$turbo.$cpq("$//test-component@1.0.x") indicates that the second loading apparatus "cpq" may be configured to load a UI service indicated by a reuse path "$/test-component@1.0.x".

Optionally, the software system may further introduce a third loading apparatus by using a running loading apparatus (for example, the first loading apparatus). The third loading apparatus may also load a UI service for the software system by performing the method in S301 to S304. There is at least one third loading apparatus.

Specifically, the first loading apparatus may introduce the third loading apparatus by using a second configuration file in the UI service package implementing a function of the first loading apparatus. The second configuration file includes code used to introduce the third loading apparatus.

In an example, code that is in the second configuration file and that is used to introduce the third loading apparatus may be as follows:

```
loader:[
{ name: 'cpq',
    rootUrl: "http://cpq.huawei.com/",
},
{ name: 'isales'.
    rootUrl: "http://isales.huawei.com/"
}
]
name: 'cpq', name: 'isales',
``` herein, the code indicates that two third loading apparatuses are introduced, including a loading apparatus 'cpq' and a loading apparatus 'isales', a network address of the third loading apparatus 'cpq' is "http://cpq.huawei.com/", and a network address of the third loading apparatus 'isales' is "http://isales.huawei.com/".

In this case, code of the UI service package implementing a function of the first loading apparatus further includes code used to indicate the foregoing two third loading apparatuses to load a UI service.

In an example, in the ES standard, when an import keyword is used, the code may be as follows:

import TestComponent1 from "$cpq/test-component@1.0.x"
import TestComponent2 from $isales/test-component@1.0.x In the ES standard, when the import key function is used, the code may be as follows:

( )>import($cpq/test-component@1.0.x);
( )>import($isales/test-component@1.0.x);

herein, for related descriptions of the import keyword and the import key function, refer to the foregoing descriptions. Details are not described herein again.

In the non-ES standard, the code may be as follows:
$turbo("$cpq/test-component@1.0.x")
$turbo("$isales/test-component@1.0.x")

In the foregoing two standards, a name of a loading apparatus in a reuse path "$cpq/test-component@1.0.x" is a third loading apparatus "cpq", and a name of a loading apparatus in a reuse path "$isales/test-component@1.0.x" is a third loading apparatus "isales".

In this way, when receiving a UI service indicated by the loading reuse path "$cpq/test-component@1.0.x", the software system may download the third loading apparatus based on the network address of the third loading apparatus in the code used to introduce the third loading apparatus in the second configuration file, and load, by using the third loading apparatus, a UI service indicated by the reuse path "$cpq/test-component@1.0.x".

It should be understood that if the software system loads the UI service by using at least two loading apparatuses (for example, the first loading apparatus and the second loading apparatus), the at least two loading apparatuses are isolated from each other. That is, the first loading apparatus and the second loading apparatus are isolated from each other. In this way, loading and running of a UI service by the first loading apparatus and loading and running of the same UI service by the second loading apparatus do not affect each other, that is, are isolated from each other.

In addition, in addition to a UI service implementing a function of a loading apparatus, a UI service package implementing the function of the loading apparatus further includes at least one UI service related to the loading apparatus. In this case, when the loading request that is sent by the software system and that is received by the loading apparatus requests to load the UI service related to the loading apparatus in the UI service package implementing the function of the loading apparatus, the loading apparatus may directly load the UI service related to the loading apparatus without performing subsequent S302 to S304.

S302: The loading apparatus determines a dependency of the to-be-loaded UI service based on the dependency graph.

Specifically, the loading apparatus may determine a reuse path of the dependency of the to-be-loaded UI service based on the dependency graph.

The dependency graph is obtained based on dependency relationship sets of some or all of the at least one UI service package. The dependency relationship sets include a dependency relationship of at least one UI service in the some or all UI service packages.

The dependency relationship of at least one UI service in the some or all UI service packages is used to indicate a dependency of the at least one UI service in the some or all UI service packages.

For descriptions of the dependency relationship set, refer to the foregoing descriptions of the first dependency relationship set in S103. Details are not described herein again.

Optionally, the dependency graph in the loading apparatus may be generated by the loading apparatus based on a dependency relationship set of at least one UI service package registered in the registration apparatus, or may be generated by the loading apparatus based on a pre-received initial dependency graph generated by the registration apparatus. The dependency graph may be used to indicate a dependency of at least one UI service in the at least one UI service package in the registration apparatus, and a UI service that references the UI service as a dependency. Herein, the registration apparatus is a registration apparatus corresponding to the loading apparatus, and there is at least one registration apparatus. For a correspondence between the loading apparatus and the registration apparatus, refer to the foregoing descriptions in S103. Details are not described herein again.

Figure 11:
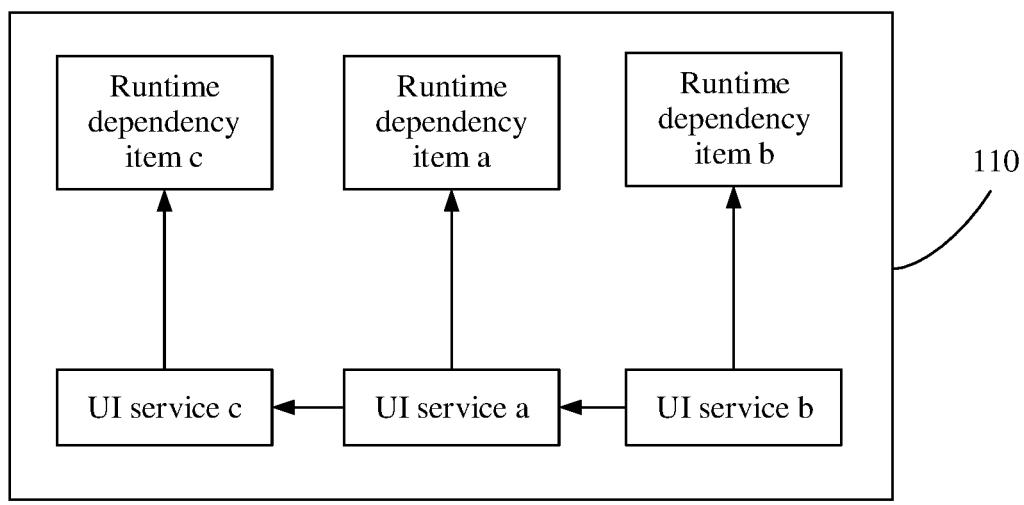
FIG. 11 is a schematic diagram of a dependency graph according to an embodiment of this application.

For example, FIG. 11 shows a dependency graph 110.

As shown in FIG. 11, the dependency graph 110 includes three dependency relationships. A dependency relationship of a UI service a includes: The UI service a is a dependency of a UI service b, the UI service a depends on a UI service c, and the UI service a depends on a runtime dependency item a (that is, a dependency of the UI service a includes the UI service c and the runtime dependency item a). A dependency relationship of the UI service b includes: The UI service b depends on the UI service a, and the UI service b depends on a runtime dependency item b (that is, a dependency of the UI service b includes the UI service a and the runtime dependency item b). A dependency relationship of the UI service c includes: The UI service c is a dependency of the UI service a, and the UI service c depends on a runtime dependency item c (that is, a dependency of the UI service c is the runtime dependency item c).

It should be understood that the dependency graph may alternatively be represented by using two sets. The two sets may be respectively a set of UI services and a set of relationships. The relationship may include a relationship between a UI service and a dependency of the UI service, a relationship between different UI services, and a relationship between dependencies of different UI services.

It may be understood that the foregoing dependency graph may include reuse paths of a runtime dependency item and at least one UI service in the some or all UI service packages.

For descriptions of the reuse path, refer to the foregoing descriptions of the reuse path in S102. Details are not described herein again.

Further, the loading apparatus may determine, in the dependency graph based on the reuse path in the loading request, the reuse path of the dependency of the to-be-loaded UI service. The to-be-loaded UI service may have at least one dependency.

It should be understood that, if the dependency of the to-be-loaded UI service is referred to as a first-level dependency, a dependency of the first-level dependency may be referred to as a second-level dependency of the to-be-loaded UI service. By analogy, a dependency of the second-level dependency may be referred to as a third-level dependency of the to-be-loaded UI service, and a dependency of the third-level dependency may be referred to as a fourth-level dependency of the to-be-loaded UI service.

In other words, a dependency of a $y^{th}$-level dependency may be referred to as a $(y+1)^{th}$-level dependency of the to-be-loaded UI service. Both the $y^{th}$-level dependency and the $(y+1)^{th}$-level dependency may include at least one of a UI service and a runtime dependency item. It should be noted that, when the $y^{th}$-level dependency includes only a runtime dependency item, the $y^{th}$-level dependency does not have a next-level dependency. That is, the $y^{th}$-level dependency is the last-level dependency of the to-be-loaded UI service. In this case, the dependency of the to-be-loaded UI service includes y levels of dependencies, where y is a positive integer.

For example, if the to-be-loaded UI service is the UI service b shown in FIG. 11, a first-level dependency of the UI service b includes the UI service a and the runtime dependency item b. Because the dependency of the UI service a includes the UI service c and the runtime dependency item a, a second-level dependency of the UI service b includes the UI service c and the runtime dependency item a. Because the dependency of the UI service c is the runtime dependency item c, a third-level dependency of the UI service b includes the runtime dependency item c. That is, the dependency of the UI service b includes three levels of dependencies.

It should be understood that, because the dependency graph may intuitively reflect a dependency relationship between UI services or between a UI service and a runtime dependency item, the loading apparatus may determine, in the dependency graph based on the reuse path in the loading request, a reuse path of each level of dependency in they levels of dependencies of the to-be-loaded UI service.

The following uses an example in which the dependency graph is generated based on dependency relationship sets of all the UI service packages registered in the registration apparatus for description.

In this case, the loading apparatus may generate the dependency graph based on a pre-obtained dependency relationship set of each UI service package registered in the registration apparatus. The following describes a process in which the loading apparatus pre-obtains the dependency relationship set of each UI service package registered in the registration apparatus.

Specifically, the loading apparatus may send a dependency obtaining request to the registration apparatus based on the network address that is of the at least one registration apparatus and that is configured in the second configuration file (refer to the second configuration file in S103).

The obtaining request is used to request to obtain a registration list in the registration apparatus, or used to request the dependency relationship set of each UI service package registered in the registration apparatus, or used to obtain the initial dependency graph generated by the registration apparatus. The registration list includes at least one of the dependency relationship set of each UI service package registered in the registration apparatus or the initial dependency graph generated by the registration apparatus.

Optionally, when running, the loading apparatus may send the dependency obtaining request to the registration apparatus based on the network address that is of the at least one registration apparatus and that is configured in the second configuration file.

Based on the dependency obtaining request, the registration apparatus sends the dependency relationship set of each UI service package registered in the registration apparatus or the initial dependency graph to the loading apparatus.

In this way, the loading apparatus can generate the dependency graph based on the received dependency relationship set of each UI service package registered in the registration apparatus or the received initial dependency graph of the registration apparatus.

In addition, it can be learned from the foregoing description that a dependency relationship set of a UI service package (for example, the first UI service package) registered in the registration apparatus may be periodically updated.

Therefore, optionally, when running, the loading apparatus may send the dependency obtaining request to the registration apparatus based on the network address that is of the at least one registration apparatus and that is configured in the second configuration file. Based on the dependency obtaining request, the registration apparatus may periodically send the dependency relationship set of each UI service package registered in the registration apparatus or the initial dependency graph to the loading apparatus.

Optionally, a dependency relationship set of a UI service package (for example, the first UI service package) registered in the registration apparatus may be periodically updated. Therefore, when running, the loading apparatus may periodically send the dependency obtaining request to the registration apparatus based on the network address that is of the at least one registration apparatus and that is configured in the second configuration file.

Correspondingly, the registration apparatus periodically sends the dependency relationship set of each UI service package registered in the registration apparatus or the initial dependency graph to the loading apparatus.

In this way, the loading apparatus can update the dependency graph based on the periodically received dependency relationship set of each UI service package registered in the registration apparatus or the periodically received initial dependency graph of the registration apparatus.

S303 (optional): The loading apparatus downloads the to-be-loaded UI service and the determined dependency of the to-be-loaded UI service based on the reuse path of the to-be-loaded UI service and the reuse path of the dependency of the to-be-loaded UI service.

Downloading the to-be-loaded UI service is a process of downloading, from a device or physical space storing the to-be-loaded UI service, the to-be-loaded UI service to a local device running the software system. Downloading the dependency of the to-be-loaded UI service is a process of downloading, from a device or physical space storing the dependency of the to-be-loaded UI service, the dependency of the to-be-loaded UI service to a local device running the software system.

It may be understood that, if the to-be-loaded UI service and/or the dependency of the to-be-loaded UI service are/is stored in the local device running the software system, the downloading step described in S303 does not need to be performed.

Specifically, the loading apparatus may concurrently download the to-be-loaded UI service and the dependency of the to-be-loaded UI service based on the reuse path of the to-be-loaded UI service in the loading request and the reuse path that is of the dependency of the to-be-loaded UI service and that is determined in step S302. Herein, the dependency of the to-be-loaded UI service includes y levels of dependencies of the to-be-loaded UI service.

Specifically, the loading apparatus may synchronously or asynchronously download concurrently the to-be-loaded UI service and the dependency of the to-be-loaded UI service based on the reuse path of the to-be-loaded UI service and the reuse path of the dependency of the to-be-loaded UI service. This is not limited.

In this way, concurrently downloading the to-be-loaded UI service and the dependency of the to-be-loaded UI service can improve efficiency of downloading the to-be-loaded UI service and the dependency of the to-be-loaded UI service by the loading apparatus, to improve efficiency of loading the to-be-loaded UI service and the dependency of the to-be-loaded UI service by the loading apparatus.

The following describes a process in which a downloader downloads the to-be-loaded UI service and the dependency of the to-be-loaded UI service by using an example in which the loading apparatus downloads the to-be-loaded UI service based on the reuse path of the to-be-loaded UI service.

For ease of description, in the description following step S303, the "reuse path of the to-be-loaded UI service" is referred to as "the reuse path" for short.

In a possible implementation, the loading apparatus obtains the registration list of the registration apparatus. In this way, the loading apparatus can determine a target UI service package of a latest version from the obtained registration list based on a name of a UI service package and a fuzzy version number of the UI service package in the reuse path. The target UI service package includes the to-be-loaded UI service. Then, the loading apparatus determines, based on registration information of the target UI service package in the registration list, a network address used to deploy the target UI service package.

In this way, the loading apparatus can download, from a device or a physical space corresponding to the determined network address, the to-be-loaded UI service in the target UI service package based on the network address, and an index directory name of a UI service and a name of a UI service in a UI service package in the reuse path.

In another possible implementation, the loading apparatus sends, to the registration apparatus, a request for determining the to-be-loaded UI service. The request includes the name of the UI service package and the fuzzy version number of the UI service package in the reuse path. In this way, the registration apparatus can determine the target UI service package of the latest version from the registration list based on the name of the UI service package and the fuzzy version number of the UI service package in the reuse path. The target UI service package includes the to-be-loaded UI service.

Then, the registration apparatus determines, based on registration information of the target UI service package in the registration list, a network address used to deploy the target UI service package.

Then, the registration apparatus sends the determined network address used to deploy the target UI service package to the loading apparatus. Correspondingly, the loading apparatus receives the network address used to deploy the target UI service package.

In this way, the loading apparatus can download, from a device or a physical space corresponding to the network address, the to-be-loaded UI service in the target UI service package based on the network address, and the index directory name of the UI service and the name of the UI service in the UI service package in the reuse path.

The following describes, by using an example, a process in which the loading apparatus or the registration apparatus searches the registration list to determine the target UI service package of the latest version based on the name of the UI service package and the fuzzy version number of the UI service package in the reuse path.

For example, the name of the UI service package in the reuse path is aaa, and the fuzzy version number of the UI service package in the reuse path is 1.1.x. If UI service packages included in the registration list include three UI service packages named aaa, a version number of the first UI service package named aaa is 1.1.1, a version number of the second UI service package named aaa is 1.1.3, and a version number of the third UI service package named aaa is 1.1.5. If a version number definition rule agreed upon by the registration apparatus and the generation apparatus is that a larger value of a version number indicates a newer version, the loading apparatus or the registration apparatus may determine that a UI service package whose name is aaa and whose version number is 1.1.5 is a UI service package of a latest version in the registration list. That is, the loading apparatus or the registration apparatus determines the UI service package as the target UI service package.

That is, by using the name of the UI service package and the fuzzy version number of the UI service package in the reuse path, the loading apparatus or the registration apparatus may find the UI service package of the latest version for the dependency of the to-be-loaded UI service. In this way, the loading apparatus may download the dependency of the to-be-loaded UI service from the UI service package of the latest version.

Therefore, even if versions of the dependency of the to-be-loaded UI service and a UI service package including the dependency are updated, a UI application built by using the UI service package in this embodiment of this application does not need to be upgraded. This saves resources.

S304: The loading apparatus loads the downloaded to-be-loaded UI service and the downloaded dependency of the to-be-loaded UI service.

Specifically, the loading apparatus may sequentially load the downloaded to-be-loaded UI service and the downloaded dependency of the to-be-loaded UI service based on the dependency graph described in step S302. That is, the loading apparatus may sequentially load, based on the dependency graph to a memory running the software system, the to-be-loaded UI service and the dependency of the to-be-loaded UI service downloaded to the local device. The local device is a local device that runs the software system.

During actual application, when the loading apparatus concurrently downloads the to-be-loaded UI service and the dependency of the to-be-loaded UI service by performing step S303, due to network factors such as a network speed and bandwidth, at least one UI service in the to-be-loaded UI service and at least one dependency of the at least one UI service are not downloaded at the same time. In this way, the loading apparatus can sequentially load a downloaded UI service and dependency based on the UI service and dependency that have been downloaded locally and according to a sequence of a dependency relationship indicated by the dependency graph. The sequence may be that a dependency is loaded first, and then a UI service that references the dependency is loaded.

For example, the to-be-loaded UI service is the UI service b shown in FIG. 11. The first-level dependency of the UI service b includes the UI service a and the runtime dependency item b, the second-level dependency of the UI service b includes the UI service c and the runtime dependency item a, and the third-level dependency of the UI service b includes the runtime dependency item c. In this way, the loading apparatus can load the UI service or the runtime dependency item in the following sequence: the runtime dependency item c □the UI service c/the runtime dependency item a□the UI service a/the runtime dependency item b □the UI service b.

Optionally, when downloading of each UI service in the to-be-loaded UI service is completed and downloading of each of dependencies of the to-be-loaded UI service is completed, the loading apparatus may determine, according to the sequence of the dependency relationship indicated by the dependency graph, whether the UI service or the dependency is an item that currently needs to be loaded. If yes, the UI service or the dependency is loaded. If no, the UI service or the dependency is loaded when the UI service or the dependency is an item that needs to be loaded currently.

In this way, the loading apparatus loads a UI service or a dependency while downloading a UI service or a dependency. This improves loading efficiency.

It may be understood that, after the loading apparatus completes loading of the to-be-loaded UI service and the dependency of the to-be-loaded UI service, the software system may render the to-be-loaded UI service and the dependency of the to-be-loaded UI service into at least one UI, and display the at least one UI. For example, the software system may display the at least one UI by using the display 640 shown in FIG. 6.

Optionally, if the dependency of the to-be-loaded UI service is a runtime dependency item, and the runtime dependency item is associated with a driver, when loading the runtime dependency item for the first time, the loading apparatus starts the driver of the runtime dependency item, to initialize the runtime dependency item.

This is because the runtime dependency item may be reused by a UI service in the to-be-loaded UI service for a plurality of times. In this process, the runtime dependency item needs to be initialized only once by using the driver associated with the runtime dependency item, and does not need to be initialized repeatedly. For related descriptions of the driver, refer to the related descriptions of the driver in S102. Details are not described herein again.

According to such a design, the loading apparatus may globally (that is, in an entire process of loading the to-be-loaded UI service) start the driver associated with the runtime dependency item once, so that the runtime dependency item is globally initialized once. In this way, compared with the conventional technology in which a developer needs to manually start a driver of a runtime dependency item to initialize the runtime dependency item, the method provided in this embodiment of this application lowers a development threshold for starting the runtime dependency item, and improves development efficiency of a UI service.

It may be understood that if the registration apparatus and the loading apparatus provided in this embodiment of this application are one apparatus, an interaction action between the registration apparatus and the loading apparatus in S301 to S304 does not need to be performed.

In this way, according to the UI service loading method provided in this embodiment of this application, because the loading apparatus may pre-obtain the dependency relationship sets of all the UI service packages registered in the registration apparatus, the loading apparatus may determine the reuse paths of all the dependencies of the to-be-loaded UI service based on all the obtained dependency relationship sets. In this way, the loading apparatus can concurrently download the to-be-loaded UI service and the dependency of the to-be-loaded UI service based on the reuse paths of the to-be-loaded UI service and the dependency of the to-be-loaded UI service, and load the to-be-loaded UI service and the dependency of the to-be-loaded UI service. This improves efficiency of loading the to-be-loaded UI service, that is, improves running efficiency of the to-be-loaded UI service that reuses a UI service or a runtime dependency item.

The UI obtained after the to-be-loaded UI service is rendered may be any UI in a tool UI application built by using the UI service package provided in this embodiment of this application, or may be any UI in a scenario-based UI application built by using the UI service package provided in this embodiment of this application. This is not limited.

In an application ecosystem oriented to public users, when the UI obtained after the to-be-loaded UI service is rendered is any UI in the scenario-based UI application built by using the UI service package provided in this embodiment of this application, a use party builds, by using different UI services in a plurality of centralized (centralized) apps (that is, tool apps), a decentralized (decentralized) app (that is, a scenario-based UI application) belonging to the use party. In this way, all content created by the use party by using the different UI services can be presented to the user by using one application entry. This improves user experience.

The different UI services provided by the plurality of centralized apps may be UI services in different UI service packages generated by the generation apparatuses in different domain middle platforms described above. Herein, different domain middle platforms may be middle platforms of service providers of the plurality of centralized apps.

In this way, a use party A can build, by using UI services in different UI service packages generated by the generation apparatuses in the different domain middle platforms, an application A belonging to the use party A. In this way, the user can view, through an entry of the application A, all content created by the use party A based on the UI services in the different UI service packages generated by the different domain middle platforms. This improves user experience.

In an enterprise digitalization application ecosystem, according to the method provided in this embodiment of this application, a use party may provide a scenario-based UI application for a user based on a user scenario. In this way, the user interacts with the scenario-based UI application once, so that an effect of a plurality of interactions between the user and a tool UI application can be achieved. This improves user experience.

In this way, according to the method provided in this embodiment of this application, a scenario-based UI application is built by reusing a UI service, so that capabilities such as large traffic brought by a 5th generation mobile network (5G) and scenario recognition brought by an AI technology are used to a maximum extent. This improves user experience when a user uses a public-oriented application or an enterprise digital application.

To describe the method provided in embodiments of this application more clearly, the following further describes the method provided in embodiments of this application by using an enterprise IT system on Huawei Cloud as an example, and by using an example in which a registration apparatus performs a UI service package registration method and a loading apparatus performs only a UI service loading method.

Figure 12:
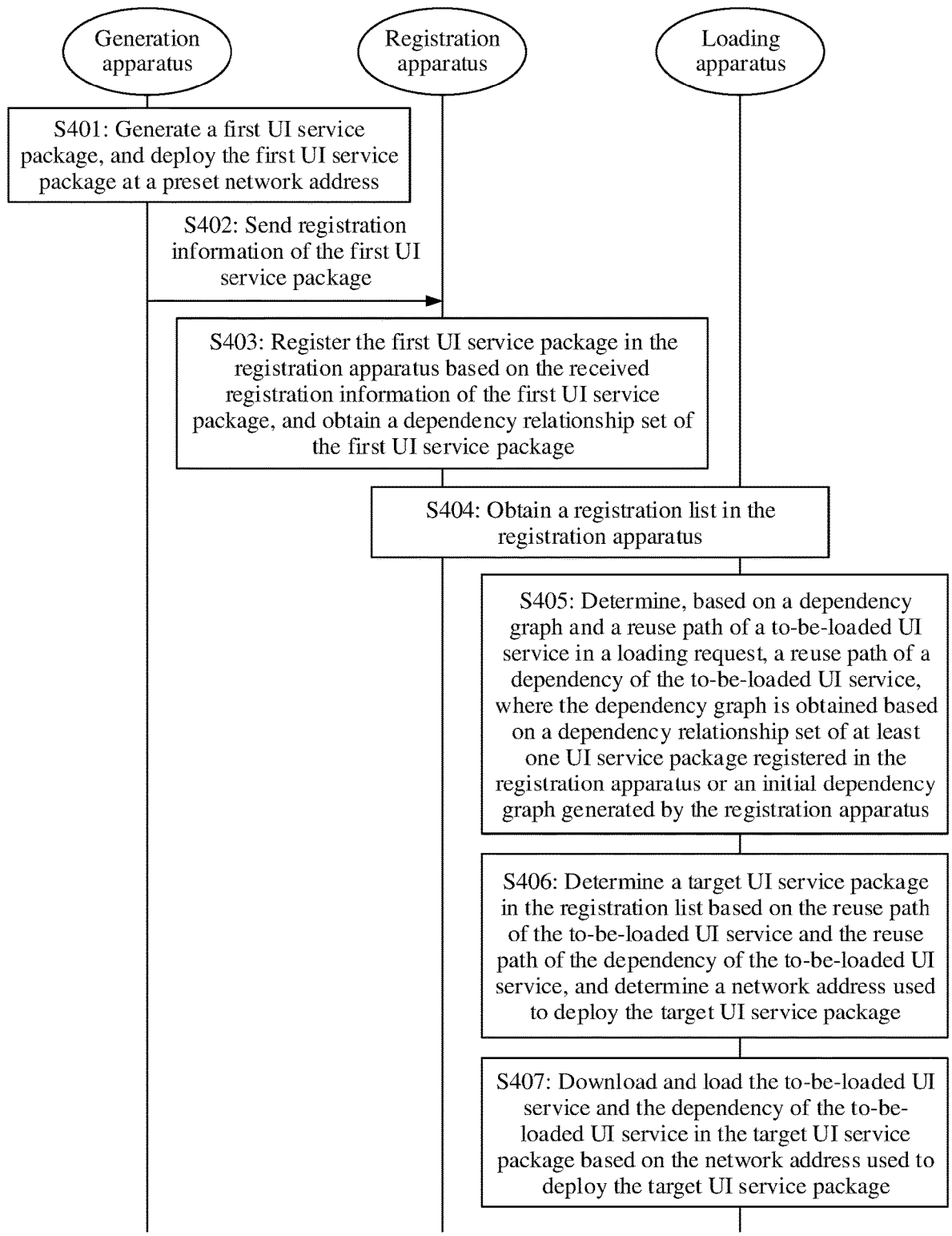
FIG. 12 is a flowchart of a method for generating and registering a UI service package and loading a UI service according to an embodiment of this application.

FIG. 12 is a flowchart of a method for generating and registering a UI service package, and loading a UI service according to an embodiment of this application. The method may include the following steps.

S401: A generation apparatus generates a first UI service package, and deploys the first UI service package at a preset network address.

The first UI service package may be UI service packages generated by generation apparatuses disposed on different middle platforms.

The first UI service package herein may be a same UI service package as the first UI service package in the flowchart shown in FIG. 8, or may be different from the first UI service package in the flowchart shown in FIG. 8. This is not limited.

Figure 13A:
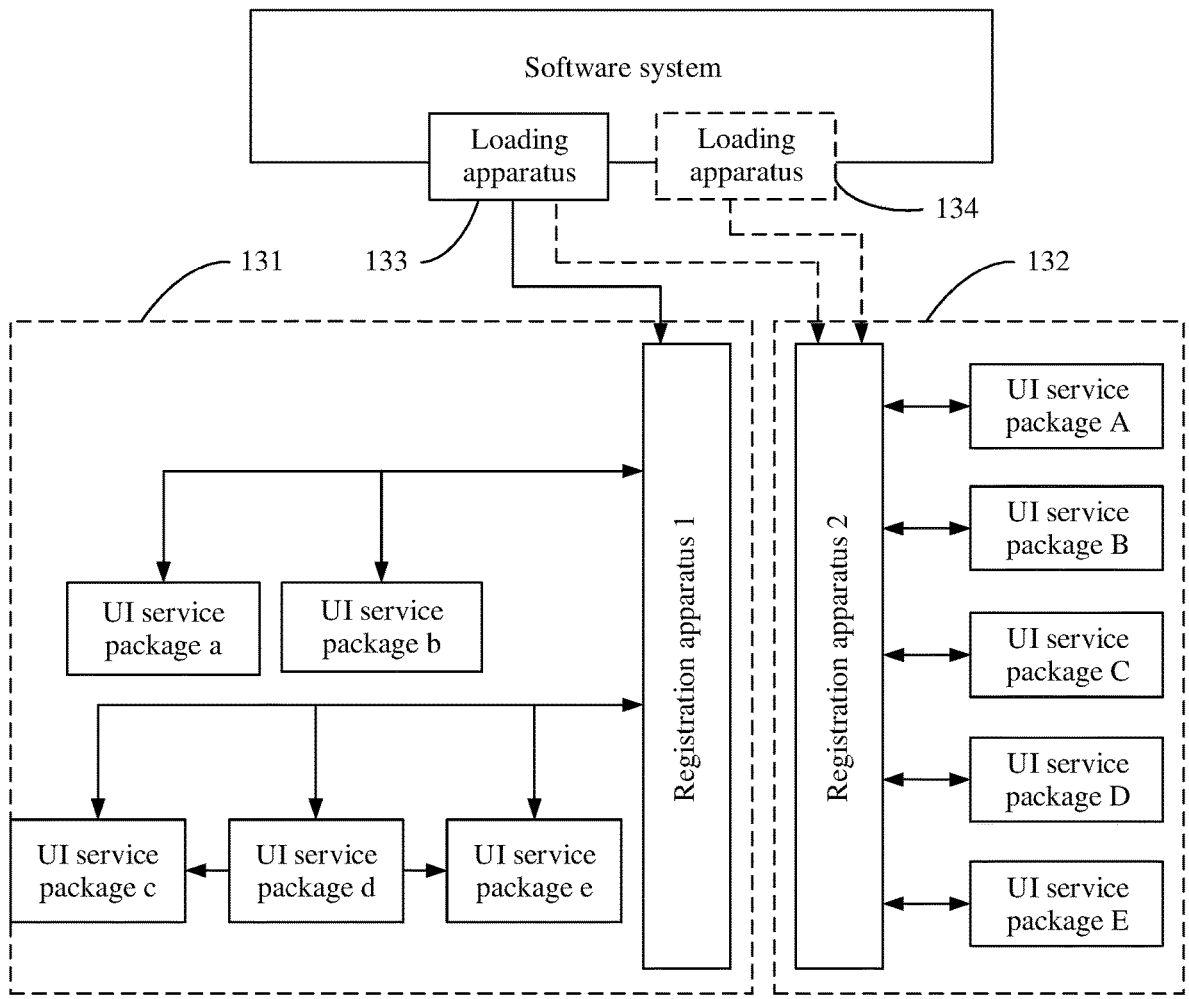
FIG. 13a is a schematic diagram 1 of a method for generating and registering a UI service package and loading a UI service according to an embodiment of this application.

For example, as shown in FIG. 13*a*, a generation apparatus disposed at a main transaction middle platform 131 of Huawei IT may generate the first UI service package by performing steps S101 to S103.

Then, the generation apparatus deploys the first UI service package at the preset network address. Details are not described herein again.

FIG. 13*a* shows the first UI service package generated by the generation apparatus disposed at the main transaction middle platform 131 of Huawei IT by performing steps S101 to S103.

The first UI service package may be any one of a UI service package a, a UI service package b, a UI service package c, a UI service package d, and a UI service package e. The UI service package a may be used to provide a UI service of providing a quotation for an operator, the UI service package b may be used to provide a UI service of providing a quotation for an enterprise, the UI service package c may be used to provide a UI service of a product, the UI service package d may be used to provide a UI service of a quotation, and the UI service package e may be used to provide a UI service of a commodity service.

The UI service package a and the UI service package b may be scenario UI service packages. The UI service package c, the UI service package d, and the UI service package e may be domain UI service packages. In addition, a UI service in the UI service package c reuses a UI service in the UI service package d, and a UI service in the UI service package e reuses a UI service in the UI service package d.

For the scenario UI service package and the domain UI service package, refer to the foregoing descriptions. Details are not described herein again.

S402: The generation apparatus sends registration information of the first UI service package to a registration apparatus.

Specifically, the generation apparatus disposed at the main transaction middle platform 131 of Huawei IT may send, based on the foregoing descriptions in step S105, the registration information of the first UI service package to a registration apparatus disposed at the main transaction middle platform 131 of Huawei IT. Details are not described herein again.

The registration information may include a name and a version number of the first UI service package, and a network address used to deploy the first UI service package.

S403: The registration apparatus registers the first UI service package in the registration apparatus based on the received registration information of the first UI service package. The registration apparatus obtains a dependency relationship set of the first UI service package.

Specifically, for a process in which the registration apparatus registers the first UI service package in the registration apparatus based on the received registration information of the first UI service package, refer to the foregoing descriptions in steps S201 to S204. Details are not described herein again.

For a process in which the registration apparatus obtains the dependency relationship set of the first UI service package, refer to the descriptions in S203. Details are not described herein again.

For example, the registration apparatus may be a registration apparatus disposed at the main transaction middle platform 131 shown in FIG. 13a, for example, a registration apparatus 1 shown in FIG. 13a.

S404: A loading apparatus obtains a registration list in the registration apparatus.

The registration list is a registration list in the registration apparatus.

Specifically, for descriptions of obtaining the registration list in the registration apparatus by the loading apparatus, refer to the foregoing descriptions of requesting, by the loading apparatus, to obtain the registration list in the registration apparatus in S302. Details are not described herein again.

S405: The loading apparatus determines a reuse path of a dependency of a to-be-loaded UI service based on a dependency graph and a reuse path of the to-be-loaded UI service in a loading request. The dependency graph is obtained based on a dependency relationship set of at least one UI service package registered in the registration apparatus or an initial dependency graph generated by the registration apparatus.

Specifically, for a process in which the loading apparatus determines the reuse path of the dependency of the to-be-loaded UI service based on the dependency graph and the reuse path of the to-be-loaded UI service in the loading request, refer to the foregoing descriptions in step S302. Details are not described herein again.

S406: The loading apparatus determines a target UI service package in the registration list based on the reuse path of the to-be-loaded UI service and the reuse path of the dependency of the to-be-loaded UI service, and determines a network address used to deploy the target UI service package.

There is at least one target UI service package, and the target UI service package includes the to-be-loaded UI service and the dependency of the to-be-loaded UI service.

Specifically, for S406, refer to the foregoing descriptions of determining, by the loading apparatus from the obtained registration list, the target UI service package of the latest version and determining the network address used to deploy the target UI service package in step S303. Details are not described herein again.

S407: The loading apparatus downloads and loads the to-be-loaded UI service and the dependency of the to-be-loaded UI service in the target UI service package based on the network address used to deploy the target UI service package.

Specifically, for S407, refer to the foregoing descriptions in steps S302 and S303. Details are not described herein again.

Similarly, according to the method provided in this embodiment of this application, a UI service package A, a UI service package B, a UI service package C, a UI service package D, and a UI service package E may be further generated at a sales digital middle platform 132 shown in FIG. 13a.

In this way, by performing the method in S401 to S407, a registration apparatus 2 at the sales digital middle platform 132 registers the UI service package A, the UI service package B, the UI service package C, the UI service package D, and the UI service package E in a registration list of the registration apparatus 2.

Then, a software system may render UI services that are downloaded and loaded by the loading apparatus 133 in the UI service package A, the UI service package B, the UI service package C, the UI service package D, and the UI service package E. Details are not described herein again.

As shown in FIG. 13a, the loading apparatus 133 shown in FIG. 13a may correspond to both the registration apparatus 1 and the registration apparatus 2. In other words, network addresses of the registration apparatus 1 and the registration apparatus 2 shown in FIG. 13a are both configured in a second configuration file of a generated UI service package implementing a function of the loading apparatus 133.

Certainly, the registration apparatus 1 and the registration apparatus 2 shown in FIG. 13a may also correspond to different loading apparatuses. For example, the registration apparatus 1 may correspond to the loading apparatus 133, and the registration apparatus 2 may correspond to a loading apparatus 134. That is, the network address of the registration apparatus 1 is configured in a second configuration file of a generated UI service package implementing a function of the loading apparatus 133, and the network address of the registration apparatus 2 is configured in a second configuration file of a generated UI service package implementing a function of the loading apparatus 134. This is not limited.

In this way, after the generation apparatus generates different domain UI service packages and scenario UI service packages at the main transaction middle platform 131 and the sales digital middle platform 132 shown in FIG. 13a, the registration apparatus registers the different domain UI service packages and scenario UI service packages. In this way, a developer can develop, based on UI services in the different domain UI service packages and scenario UI service packages, scenario-based UI applications applicable to different user scenarios. When receiving a request for loading any UI of the scenario-based UI application, the software system may load a UI service corresponding to the UI by using the loading apparatus provided in this embodiment of this application, to obtain the UI after the loaded UI service is rendered.

The following briefly describes an ecosystem constructed by using the UI service package generation method, the UI service package registration method, and the UI service loading method provided in embodiments of this application.

Figure 13B:
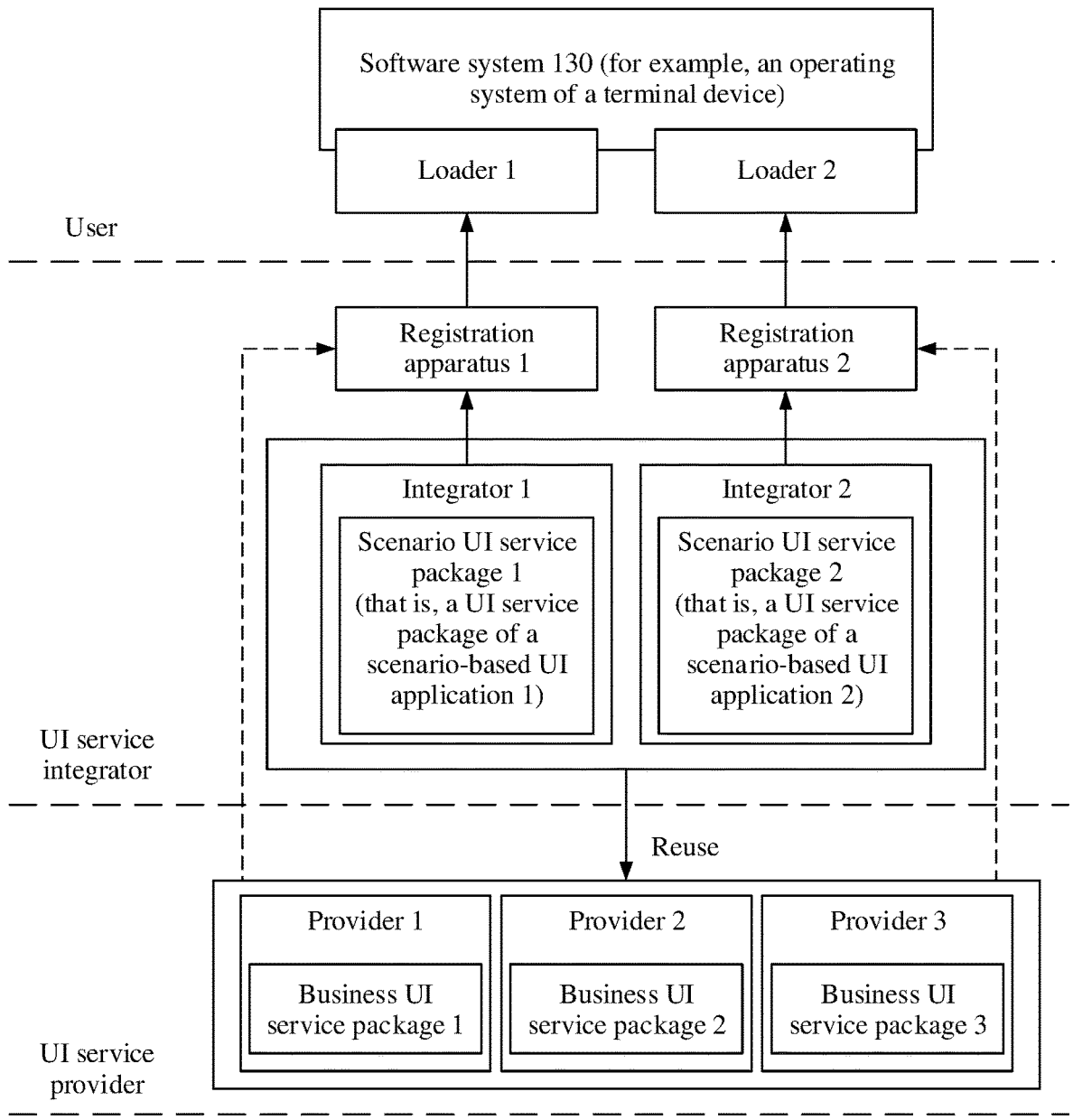
FIG. 13b is a schematic diagram 2 of a method for generating and registering a UI service package and loading a UI service according to an embodiment of this application.

Specifically, as shown in FIG. 13b, at a UI service provider layer, UI service providers may generate business UI service packages of respective domains of expertise at respective middle platforms.

The UI service provider may be the service provider described above. As shown in FIG. 13b, a provider 1 may generate a business UI service package 1 of a domain of expertise of the provider 1 at a middle platform of the provider 1, a provider 2 may generate a business service package 2 of a domain of expertise of the provider 2 at a middle platform of the provider 2, and a provider 3 may generate a business service package 3 of domain of expertise of the provider 3 at a middle platform of the provider 3. There is at least one business UI service package 1, at least one business UI service package 2, and at least one business UI service package 3. The business UI service package 1, the business UI service package 2, and the business UI service package 3 each may be a domain UI service package or a scenario UI service package.

For a process in which the providers generate the respective business UI service packages at the respective middle platforms, refer to the foregoing descriptions of generating the UI service package. Details are not described herein again.

It may be understood that the provider may publish, on respective websites or at another public platform (for example, an application store of an operating system), the registration information of the business UI service packages generated at the respective middle platforms, so that an integrator of a scenario-based UI application can obtain related information of the business UI service packages provided by the UI service providers, for example, registration information of the business UI service packages and initial reuse paths of UI services in the business UI service packages.

At a UI service integrator layer, a UI service integrator may reuse the UI service provided by the UI service provider based on the information about the business UI service package provided by the UI service provider and obtained from the website of the UI service provider or the another public platform, to develop and generate a scenario UI service package of the UI service provider, so as to obtain a scenario-based UI application. As shown in FIG. 13b, an integrator 1 may develop a scenario UI service package 1 belonging to the integrator 1 by reusing UI services provided by the UI service providers 1, 2, and 3, to obtain a scenario-based UI application 1 of the integrator 1, for example, a UI application in a financial scenario. An integrator 2 may develop a scenario UI service package 2 belonging to the integrator 2 by reusing UI services provided by the UI service providers 1, 2, and 3, to obtain a scenario-based UI application 2 of the integrator 2, for example, a UI application in a real estate scenario. There is at least one scenario UI service package 1 and at least one scenario UI service package 2.

For a process in which an integrator generates a scenario UI service package of the integrator by reusing a UI service package of a UI service provider, refer to the foregoing process of generating a UI service package. Details are not described herein again.

The UI service integrator may be a UI service provider at the UI service provider layer shown in FIG. 13b, or may be a use party that builds a decentralized app. This is not limited.

Optionally, the integrator may register the developed and generated scenario UI service package in a registration apparatus of the integrator or a registration center (for example, a module or a unit having a function of the registration apparatus in the foregoing description) of the software system. If the integrator registers the developed and generated scenario UI service package in the registration apparatus of the integrator, the integrator further presets a network address of the registration apparatus of the integrator in a configuration file of a loading apparatus of the integrator or in a configuration file of a loading apparatus of the software system. The configuration file of the loading apparatus may be the second configuration file described above.

For related descriptions of registering, by the integrator, the developed and generated scenario UI service package in the registration apparatus of the integrator or the registration center of the software system, refer to the foregoing descriptions of registering a UI service package. Details are not described herein again.

In this way, at a user layer, the software system may load, by using the loading apparatus of the software system, a UI service in the scenario UI service package registered in the registration center of the software system, to display, to a user on a display interface of a terminal device running the software system, a UI obtained by rendering the loaded UI service. Alternatively, the software system may load, by introducing the loading apparatus of the integrator, a UI service in the scenario UI service package registered in the registration apparatus of the integrator, to display, to a user on a display interface of a terminal device running the software system, a UI obtained by rendering the loaded UI service.

For related descriptions of introducing the loading apparatus of the integrator into the software system and related descriptions of loading the UI service by the loading apparatus, refer to the foregoing descriptions in the UI service loading method. Details are not described herein again.

As shown in FIG. 13b, the software system 130 may be an operating system of the terminal device. For example, the software system may be the HarmonyOS. The terminal device may be a mobile device or a computing device, or the terminal device may be a large-screen device. This is not limited. A loading apparatus 1 and a loading apparatus 2 may be configured in the software system 130.

The loading apparatus 1 is associated with a registration apparatus 1, and the loading apparatus 2 is associated with a registration apparatus 2. The registration apparatus 1 may be a registration apparatus of the integrator 1, or may be a registration center of the software system. The registration apparatus 2 may be a registration apparatus of the integrator 2, or may be a registration center of the software system. This is not limited. If the registration apparatus 1 is the registration center of the software system, an interface of the registration center is preset in a configuration file of the loading apparatus 1 of the software system. If the registration apparatus 1 is a registration apparatus of an integrator, the network address of the registration apparatus 1 is preset in the configuration file of the loading apparatus 1 of the software system. Similarly, if the registration apparatus 2 is the registration center of the software system, an interface of the registration center is preset in a configuration file of the loading apparatus 2 of the software system. If the registration apparatus 2 is a registration apparatus of an integrator, the network address of the registration apparatus 2 is preset in the configuration file of the loading apparatus 2 of the software system.

As shown in FIG. 13b, the business UI service package generated by the UI service provider may also be registered in the registration apparatus 1 and/or the registration apparatus 2. In this way, for any UI service provider, after the UI service provider builds a tool UI application or a scenario-based UI application by using a business UI service package generated at a middle platform of the UI service provider, a UI service in the tool UI application or the scenario-based UI application may also be loaded by using a loading apparatus 1 corresponding to the registration apparatus 1, or loaded by using the loading apparatus 2 corresponding to the registration apparatus 2.

It may be understood that for any one of the UI service providers shown in FIG. 13b, for example, for the provider 1, a process in which the provider 1 generates a UI service package, registers the UI service package, and loads a UI service by using the loading apparatus at the middle platform of the provider 1 may be similar to the process of generating the UI service package, registering the UI service package, and loading the UI service described in FIG. 13a.

It may be understood that all UI service packages shown in FIG. 13b are UI service packages generated based on the software system 130 shown in FIG. 13b. After any UI service in the UI service package is loaded and rendered, a UI that can be displayed on the display interface of the terminal device running the software system may be obtained.

In conclusion, this application provides, by using an example, the method for generating and registering a UI service package, and loading a UI service. According to the method, a UI service can be efficiently reused between different UI service packages by using a reuse path in reuse code.

Furthermore, according to the UI service package generation method provided in this embodiment of this application, the generation apparatus can obtain a UI service package based on a same development framework. When a UI application is obtained through integration by using a UI service in the UI service package, a threshold for subsequently integrating UI services by a developer can be lowered.

In addition, in the method, the UI service package obtained by converting code by the development framework further includes dependency relationships of UI services in the UI service package. In this way, after the UI service package is registered in the registration apparatus, the registration apparatus can obtain the dependency relationships of the UI service in the UI service package. In this way, the loading apparatus can obtain the dependency relationship from the registration apparatus, and can determine reuse paths of all dependencies of a to-be-loaded UI service based on the dependency relationship, further concurrently download the to-be-loaded UI service and a dependency of the to-be-loaded UI service based on reuse paths of the to-be-loaded UI service and the dependency of the to-be-loaded UI service, and load the to-be-loaded UI service and the dependency of the to-be-loaded UI service. This improves efficiency of loading the UI service, that is, improves running efficiency of the to-be-loaded UI service that reuses a UI service or a runtime dependency item.

During actual application, in the existing application ecosystem oriented to public users, a use party can create content for users (that is, end consumers who view the content) by using a plurality of centralized apps (that is, tool capabilities). In addition, the user needs to view, through entries of the plurality of centralized apps, the content created by the use party.

For example, a use party A may create different content for a user A by using capabilities of an app 1 and an app 2. In this way, the user A needs to view, through an entry of the app 1, content created by the use party by using the app 1, and view, through an entry of the app 2, content created by the use party by using the app 2.

According to the method provided in this embodiment of this application, the use party may build, by using different UI services in a plurality of centralized apps, a decentralized app (that is, a scenario-based UI application) belonging to the use party, and present, to a user by using an application entry, all content created by the use party by using the different UI services. This improves user experience.

In an enterprise digitalization application ecosystem, according to the method provided in this embodiment of this application, a use party may provide a scenario-based UI application for a user based on a user scenario. In this way, the user interacts with the scenario-based UI application once, so that an effect of a plurality of interactions between the user and a tool UI application can be achieved. This improves user experience.

In this way, according to the method provided in this embodiment of this application, a UI is built by reusing a UI service, so that capabilities such as large traffic brought by a 5th generation mobile network (5G) and scenario recognition brought by an AI technology are used to a maximum extent. This improves user experience when a user uses a public-oriented application or an enterprise digital application.

The foregoing mainly describes the solutions provided in embodiments of this application from the perspective of the methods. To implement the foregoing functions, corresponding hardware structures and/or software modules for performing the functions are included. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In embodiments of this application, the generation apparatus, the registration apparatus, and the loading apparatus may be divided into function modules based on the foregoing method example. For example, each function module may be obtained through division based on a corresponding function, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used.

Figure 14:
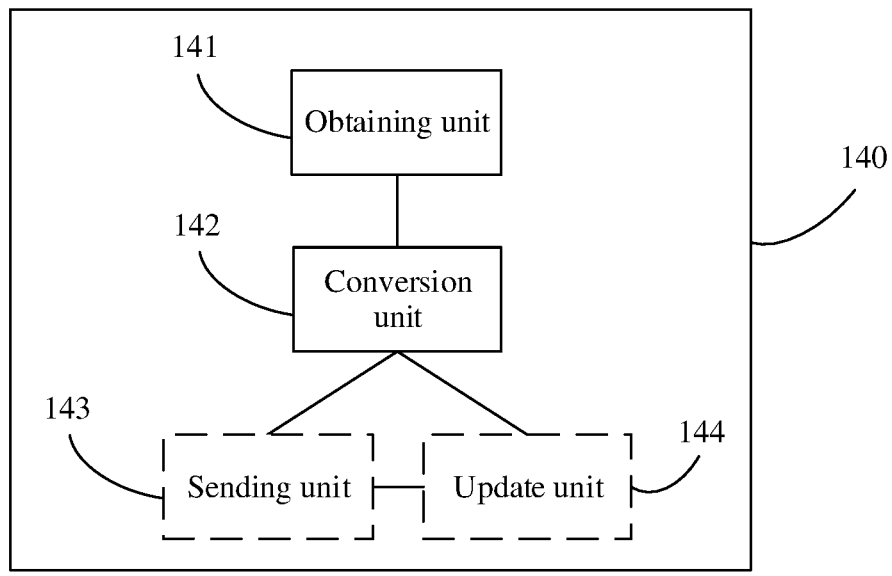
FIG. 14 is a schematic diagram of a structure a UI service package generation apparatus according to an embodiment of this application.

FIG. 14 is a schematic diagram of a structure of a generation apparatus 140 according to an embodiment of this application.

The generation apparatus 140 is configured to perform the UI service package generation method, for example, configured to perform the method shown in FIG. 8. The generation apparatus 140 may include an obtaining unit 141 and a conversion unit 142.

The obtaining unit 141 is configured to obtain code of a UI service, where the code of the UI service includes a reuse path, and the reuse path is used to indicate an access path of a dependency of the service. The conversion unit 142 is configured to convert the code of the UI service obtained by the obtaining unit 141, to obtain a first UI service package, where the first UI service package includes at least one UI service.

In an example, with reference to FIG. 8, the obtaining unit 141 may be configured to perform S102, and the conversion unit 142 may be configured to perform S103.

Optionally, a reuse path in code of a first UI service in the first UI service package meets at least one of the following conditions:

The reuse path in the code of the first UI service is used to indicate an access path of a second UI service, where the second UI service is a dependency of the first UI service, the second UI service is any UI service in a second UI service package, and the second UI service package is a UI service package different from the first UI service package; or the reuse path in the code of the first UI service is used to indicate an access path of a runtime dependency item, where the runtime dependency item is a dependency of the first UI service, the runtime dependency item is any runtime dependency item in at least one common dependency UI service package, the at least one common dependency UI service package includes at least one runtime dependency item, and the at least one common dependency UI service package is used to provide a dependency for a UI service in at least one UI service package registered in at least one UI service package registration apparatus. The first UI service is any UI service in the first UI service package.

Optionally, the reuse path in the code of the first UI service includes a fuzzy version number, and the fuzzy version number is used to indicate the second UI service package or the at least one common dependency UI service package that meets a preset version condition.

Optionally, the code of the UI service obtained by the obtaining unit 141 is written based on a development framework. The conversion unit 142 is specifically configured to convert, by using the development framework, the code of the UI service obtained by the obtaining unit 141, to obtain the first UI service package.

In an example, with reference to FIG. 8, the conversion unit 142 may be configured to perform S103.

Optionally, the second UI service package or the common dependency UI service package is obtained based on the development framework.

Optionally, the conversion unit 142 is specifically configured to convert, based on a preset configuration file by using the development framework, the code of the UI service obtained by the obtaining unit 141, to obtain the first UI service package. The configuration file is used to indicate a type of the first UI service package, and the type of the first UI service package is used to indicate a use of the first UI service package.

In an example, with reference to FIG. 8, the conversion unit 142 may be configured to perform S103.

Optionally, the type of the first UI service package includes at least one of the following: a business UI service package, a UI service package implementing a function of a loading apparatus, or a common dependency UI service package.

Optionally, the generation apparatus 140 further includes a sending unit 143, configured to publish registration information of the first UI service package. The registration information includes a name of the first UI service package and a network address used to deploy the first UI service package, and the registration information is used to register the first UI service package in the at least one UI service package registration apparatus.

In an example, with reference to FIG. 8, the sending unit 143 may be configured to perform S105.

Optionally, the first UI service package includes a first dependency relationship set. The first dependency relationship set includes a dependency relationship of the at least one UI service in the first UI service package. The dependency relationship is used to indicate a dependency of the at least one UI service in the first UI service package.

Optionally, the sending unit 143 is further configured to send the first dependency relationship set to the at least one UI service package registration apparatus, where the first UI service package is registered in the at least one UI service package registration apparatus.

In an example, with reference to FIG. 8, the sending unit 143 may be configured to perform S106.

Optionally, the generation apparatus 140 further includes an update unit 144, configured to update the first UI service package. The updated first UI service package includes a second dependency relationship set, and the second dependency relationship set includes a dependency relationship of at least one UI service in the updated first UI service package.

In an example, with reference to FIG. 8, the update unit 144 may be configured to perform S107.

Optionally, the sending unit 143 is further configured to send the second dependency relationship set to the at least one UI service package registration apparatus.

In an example, with reference to FIG. 8, the sending unit 143 may be configured to perform S108.

Optionally, all or some UI services in the first UI service are allowed to be referenced as dependencies.

For specific descriptions of the optional manners, refer to the method embodiments. Details are not described herein again. In addition, for descriptions of any explanation and beneficial effect of the generation apparatus 140 provided above, refer to the foregoing corresponding method embodiments. Details are not described herein again.

In an example, with reference to FIG. 4, the generation apparatus 140 may be implemented by using the computer device 40 in FIG. 4.

Specifically, functions implemented by the obtaining unit 141, the conversion unit 142, and the update unit 144 in the generation apparatus 140 may be implemented by the processor 41 in FIG. 4 by executing the program code in the memory 42 in FIG. 4. A function implemented by the sending unit 143 may be implemented by using the communications interface 43 in FIG. 4.

Figure 15:
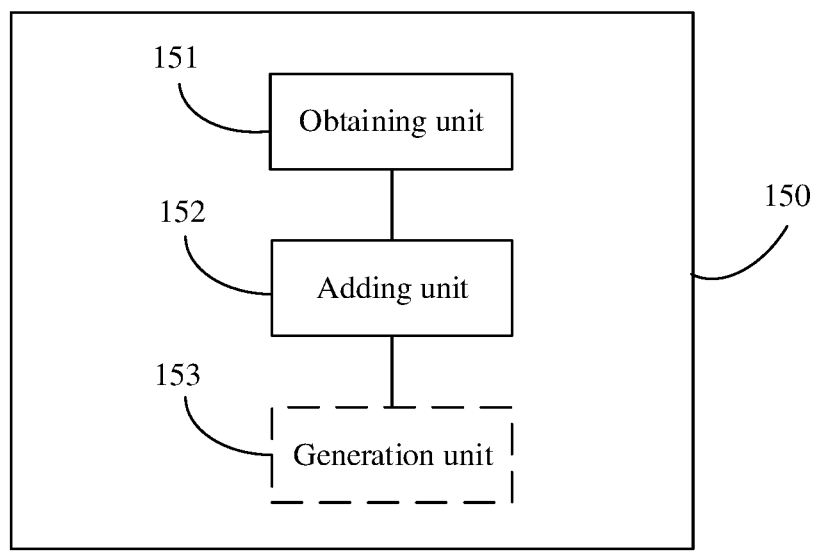
FIG. 15 is a schematic diagram of a structure a UI service package registration apparatus according to an embodiment of this application.

FIG. 15 is a schematic diagram of a structure of a registration apparatus 150 according to an embodiment of this application.

The registration apparatus 150 is configured to perform the UI service package registration method, for example, configured to perform the method shown in FIG. 9. The registration apparatus 150 may include an obtaining unit 151 and an adding unit 152.

The obtaining unit 151 is configured to obtain registration information of a first UI service package, where the registration information includes a name of the first UI service package and a network address used to deploy the first UI service package. The adding unit 152 is configured to add the registration information obtained by obtaining unit 151 to a registration list of the registration apparatus 150, where code of a first UI service in the first UI service package includes a reuse path, the reuse path is used to indicate an access path of a dependency of the first UI service, and the first UI service is any UI service in the first UI service package.

In an example, with reference to FIG. 9, the obtaining unit 151 may be configured to perform S201, and the adding unit 152 may be configured to perform S202.

Optionally, the reuse path meets at least one of the following conditions:

The reuse path is used to indicate an access path of a second UI service, where the second UI service is a dependency of the first UI service, the second UI service is any UI service in a second UI service package, and the second UI service package is a UI service package different from the first UI service package; or the reuse path is used to indicate an access path of a runtime dependency item, where the runtime dependency item is a dependency of the first UI service, the runtime dependency item is any runtime dependency item in at least one common dependency UI service package, the at least one common dependency UI service package includes at least one runtime dependency item, and the at least one common dependency UI service package is used to provide a dependency for a UI service in at least one UI service package registered in at least one UI service package registration apparatus.

Optionally, the reuse path includes a fuzzy version number of the first UI service package.

Optionally, the obtaining unit 151 is further configured to obtain a dependency relationship set of the first UI service package. The dependency relationship set includes a dependency relationship of at least one UI service in the first UI service package. A dependency relationship of the first UI service is used to indicate a dependency of the first UI service.

In an example, with reference to FIG. 9, the obtaining unit 151 may be configured to perform S203.

Optionally, the obtaining unit 151 is specifically configured to periodically obtain the dependency relationship set from the first UI service package based on the network address in the registration information.

In an example, with reference to FIG. 9, the obtaining unit 151 may be configured to perform S203.

Optionally, the obtaining unit 151 is specifically configured to receive a dependency relationship set sent by an apparatus generating the first UI service package.

In an example, with reference to FIG. 9, the obtaining unit 151 may be configured to perform S203.

Optionally, the registration apparatus 150 further includes: a generation unit 153, configured to generate an initial reuse path of the at least one UI service in the first UI service package based on the registration information obtained by the obtaining unit 151 and a version number of the first UI service package. The initial reuse path includes the version number of the first UI service package.

In an example, with reference to FIG. 9, the generation unit 153 may be configured to perform S204.

Optionally, the initial reuse path is used to determine a reuse path of the at least one UI service in the first UI service package. Both the initial reuse path and the reuse path are used to indicate an access path of the at least one UI service in the first UI service package.

For specific descriptions of the optional manners, refer to the method embodiments. Details are not described herein again. In addition, for descriptions of any explanation and beneficial effect of the registration apparatus 150 provided above, refer to the foregoing corresponding method embodiments. Details are not described herein again.

In an example, with reference to FIG. 4, the registration apparatus 150 may be implemented by using the computer device 40 in FIG. 4.

Specifically, functions implemented by the obtaining unit 151, the adding unit 152, and the generation unit 153 in the registration apparatus 150 may be implemented by the processor 41 in FIG. 4 by executing the program code in the memory 42 in FIG. 4.

Figure 16:
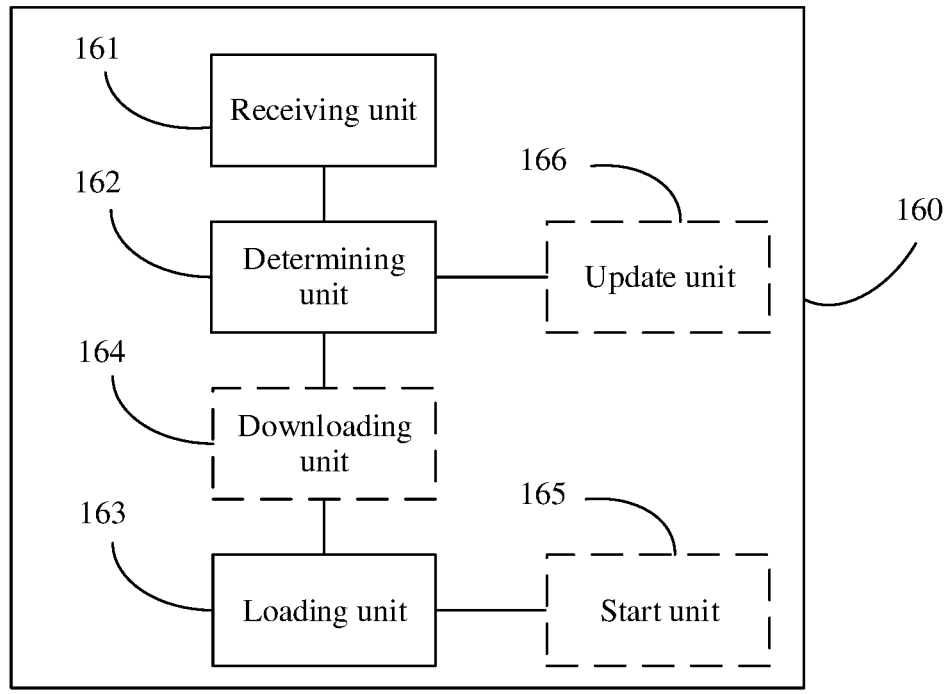
FIG. 16 is a schematic diagram of a structure of a loading apparatus according to an embodiment of this application.

FIG. 16 is a schematic diagram of a structure of a loading apparatus 160 according to an embodiment of this application.

The loading apparatus 160 is configured to perform the UI service loading method, for example, configured to perform the method shown in FIG. 10. The loading apparatus 160 may include a receiving unit 161, a determining unit 162, and a loading unit 163.

The receiving unit 161 is configured to receive a loading request. The loading request is used to request to load a to-be-loaded UI service, and the loading request includes a reuse path of the to-be-loaded UI service. The reuse path of the to-be-loaded UI service is used to indicate an access path of the to-be-loaded UI service. The determining unit 162 is configured to determine a dependency of the to-be-loaded UI service based on a dependency graph. The dependency graph indicates a dependency of at least one UI service in at least one UI service package, and indicates a UI service that references any UI service in the at least one UI service package as a dependency. The loading unit 163 is configured to load the to-be-loaded UI service and the dependency of the to-be-loaded UI service.

In an example, with reference to FIG. 10, the receiving unit 161 may be configured to perform S301, the determining unit 162 may be configured to perform S302, and the loading unit 163 may be configured to perform S304.

Optionally, the reuse path of the to-be-loaded UI service includes a fuzzy version number of a UI service package including the to-be-loaded UI service.

Optionally, the dependency graph is obtained based on dependency relationship sets of some or all of the at least one UI service package.

Optionally, the dependency relationship sets include a dependency relationship of at least one UI service in the some or all UI service packages. The dependency relationship of the at least one UI service in the some or all UI service packages is used to indicate a dependency of the at least one UI service in the some or all UI service packages.

Optionally, code of any UI service in the at least one UI service package includes a reuse path. The reuse path in the code of the UI service is used to indicate an access path of a dependency of the UI service.

Optionally, the at least one UI service package is a UI service package registered in at least one UI service package registration apparatus.

Optionally, the at least one UI service package includes a first UI service package, and a reuse path in code of a first UI service in the first UI service package meets at least one of the following conditions:

The reuse path in the code of the first UI service is used to indicate an access path of a second UI service, where the second UI service is a dependency of the first UI service, the second UI service is any UI service in a second UI service package, and the second UI service package is a UI service package different from the first UI service package; or the reuse path in the code of the first UI service is used to indicate an access path of a runtime dependency item, where the runtime dependency item is a dependency of the first UI service, the runtime dependency item is any runtime dependency item in at least one common dependency UI service package, the at least one common dependency UI service package includes at least one runtime dependency item, and the at least one common dependency UI service package is used to provide a dependency for a UI service in at least one UI service package registered in at least one UI service package registration apparatus. The first UI service package is any UI service package in the at least one UI service package, and the first UI service is any UI service in the first UI service package.

Optionally, the determining unit 162 is specifically configured to determine a reuse path of the dependency of the to-be-loaded UI service based on the dependency graph.

In an example, with reference to FIG. 10, the determining unit 162 may be configured to perform S302.

Optionally, the loading apparatus 160 further includes: a downloading unit 164, configured to: before the loading unit 163 loads the to-be-loaded UI service and the dependency of the to-be-loaded UI service, concurrently download the to-be-loaded UI service and the dependency of the to-be-loaded UI service based on the reuse path of the to-be-loaded UI service and the reuse path that is of the dependency of the to-be-loaded UI service and that is determined by the determining unit 162. The loading unit 163 is specifically configured to load the to-be-loaded UI service and the dependency of the to-be-loaded UI service that are downloaded by the downloading unit 164.

In an example, with reference to FIG. 10, the downloading unit 164 may be configured to perform S303.

Optionally, the loading unit 163 is further specifically configured to sequentially load, based on a dependency relationship indicated by the dependency graph, the to-be-loaded UI service and the dependency of the to-be-loaded UI service that are downloaded by the downloading unit 164.

In an example, with reference to FIG. 10, the loading unit 163 may be configured to perform S304.

Optionally, the loading apparatus 160 further includes: a start unit 165, configured to: if the dependency is a runtime dependency item, start a driver of the runtime dependency item when the runtime dependency item is loaded for the first time in a process in which the loading unit 163 loads the at least one UI service and the dependency.

Optionally, the loading apparatus 160 further includes: an update unit 166, configured to update the dependency graph.

Optionally, if the loading apparatus 160 includes a first loading apparatus and a second loading apparatus, the first loading apparatus is isolated from the second loading apparatus. Both the first loading apparatus and the second loading apparatus are configured to load a UI service for a software system.

For specific descriptions of the optional manners, refer to the method embodiments. Details are not described herein again. In addition, for descriptions of any explanation and beneficial effect of the loading apparatus 160 provided above, refer to the foregoing corresponding method embodiments. Details are not described herein again.

In an example, with reference to FIG. 6, the loading apparatus 160 may be implemented by using the mobile phone 60 in FIG. 6.

Specifically, functions implemented by the determining unit 162, the loading unit 163, the update unit 166, and the start unit 165 in the loading apparatus 160 may be implemented by the processor 610 in FIG. 6 by executing the program code in the internal memory 621 in FIG. 6. Functions implemented by the receiving unit 161 and the downloading unit 164 may be implemented by using the mobile communications module 650 or the wireless communications module 660 in FIG. 6.

An embodiment of this application further provides a software system. The software system includes the loading apparatus shown in FIG. 16, to load a to-be-loaded UI service.

Alternatively, the software system includes the generation apparatus shown in FIG. 14, to generate a UI service package.

Alternatively, the software system includes the registration apparatus shown in FIG. 15, to register a UI service package in a registration list of the software system.

Figure 17:
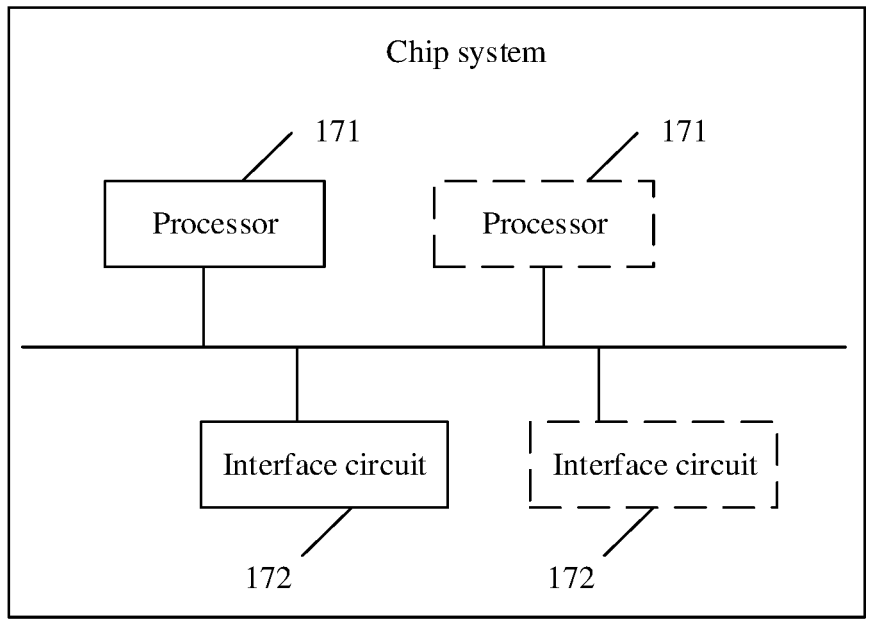
FIG. 17 is a schematic diagram of a structure of a chip system according to an embodiment of this application.

An embodiment of this application further provides a chip system. As shown in FIG. 17, the chip system 170 includes at least one processor and at least one interface circuit.

In an example, when the chip system 170 includes one processor and one interface circuit, the processor may be a processor 171 shown in a solid line box (or a processor 171 shown in a dashed line box) in FIG. 17, and the interface circuit may be an interface circuit 172 shown in a solid line box (or an interface circuit 172 shown in a dashed box) in FIG. 17. When the chip system 170 includes two processors and two interface circuits, the two processors include the processor 171 shown in the solid line box and the processor 171 shown in the dashed line box in FIG. 17, and the two interface circuits include the interface circuit 172 shown in the solid line box and the interface circuit 172 shown in the dashed line box in FIG. 17. This is not limited.

The processor 171 and the interface circuit 172 may be interconnected through a line. For example, the interface circuit 172 may be configured to receive a signal from another apparatus (for example, a memory of a generation apparatus and a registration apparatus). For another example, the interface circuit 172 may be configured to send a signal to another apparatus (for example, the processor 171).

For example, the interface circuit 172 may read instructions stored in the memory, and send the instructions to the processor 171. When the processor 171 invokes the instructions, the steps in FIG. 8, FIG. 9, or FIG. 10 are performed. Certainly, the chip system may further include another discrete device. This is not specifically limited in this embodiment of this application.

Another embodiment of this application further provides a computer-readable storage medium. The computer-readable storage medium stores instructions. When the instructions are run on a generation apparatus, a registration apparatus, or a loading apparatus, the generation apparatus, the registration apparatus, or the loading apparatus performs the steps performed by the generation apparatus, the registration apparatus, or the loading apparatus in the method procedures shown in the method embodiments.

In some embodiments, the disclosed methods may be implemented as computer program instructions encoded in a machine-readable format on a computer-readable storage medium or encoded on another non-transitory medium or product.

Figure 18:
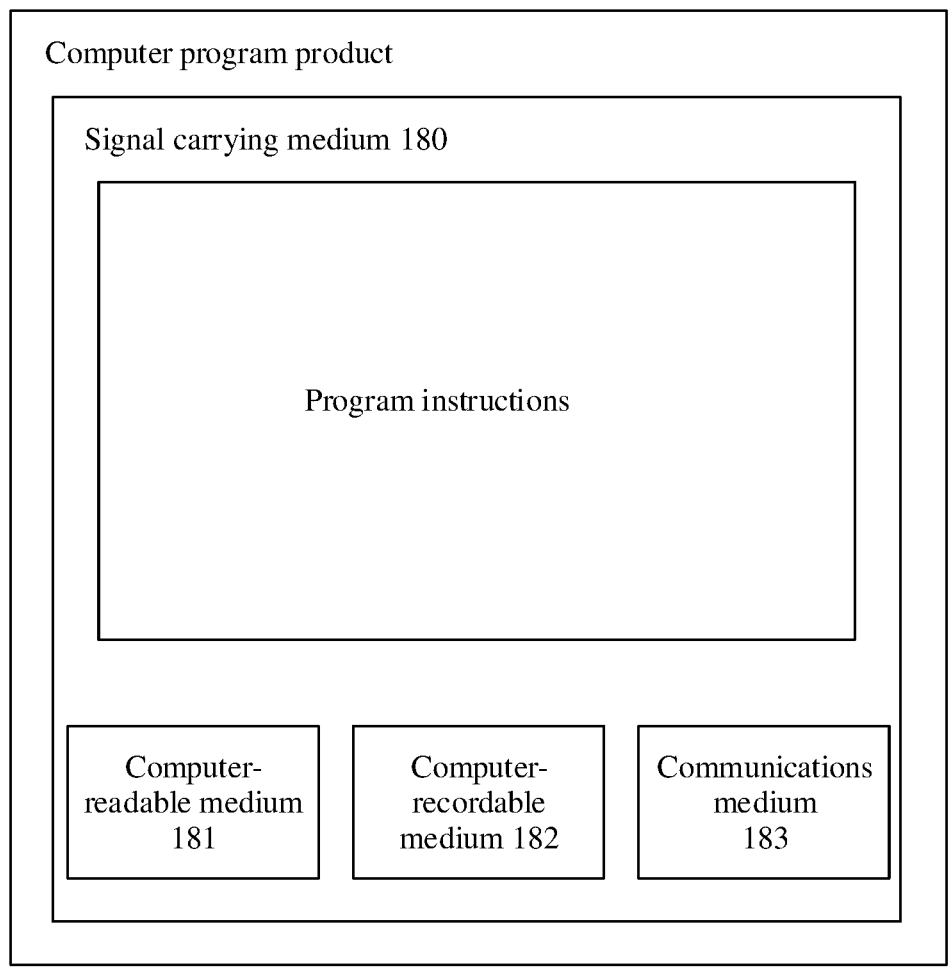
FIG. 18 is a schematic diagram of a structure of a computer program product according to an embodiment of this application.

FIG. 18 schematically shows a conceptual partial view of a computer program product according to an embodiment of this application. The computer program product includes a computer program used to execute a computer process on a computing device.

In an embodiment, the computer program product is provided by using a signal carrying medium 180. The signal carrying medium 180 may include one or more program instructions. When the one or more program instructions are run by one or more processors, the functions or some of the functions described above with respect to FIG. 8, FIG. 9, and FIG. 10 may be provided.

Therefore, for example, one or more features of S101 to S108 in FIGS. 8, S201 to S204 in FIG. 9, or S301 to S304 in FIG. 10 may be undertaken by one or more instructions associated with the signal carrying medium 180. In addition, the program instructions in FIG. 18 are also described as example instructions.

In some examples, the signal carrying medium 180 may include a computer-readable medium 181, for example, but not limited to, a hard disk drive, a compact disc (CD), a digital video disc (DVD), a digital tape, a memory, a read-only memory (ROM), a random access memory (RAM), or the like.

In some implementations, the signal carrying medium 180 may include a computer-recordable medium 182, for example, but not limited to, a memory, a read/write (R/W) CD, an R/W DVD, and the like.

In some implementations, the signal carrying medium 180 may include a communications medium 183, for example, but is not limited to a digital and/or analog communications medium (for example, an optical fiber cable, a waveguide, a wired communication link, or a wireless communication link).

The signal carrying medium 180 may be conveyed by a wireless-form communications medium 183 (for example, a wireless communications medium that complies with the IEEE 802.11 standard or another transmission protocol). The one or more program instructions may be, for example, one or more computer-executable instructions or one or more logic implementation instructions.

In some examples, the generation apparatus, the registration apparatus, or the loading apparatus described in FIG. 8, FIG. 9, or FIG. 10 may be configured to provide various operations, functions, or actions in response to one or more program instructions in the computer-readable medium 181, the computer-recordable medium 182, and/or the communications medium 183.

It should be understood that the arrangement described herein is merely used as an example. Thus, persons skilled in the art appreciate that another arrangement and another element (for example, a machine, an interface, a function, a sequence, and an array of functions) can be used to replace the arrangement, and some elements may be omitted together depending on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A user interface (UI) service loading method, wherein the method comprises:

receiving a loading request, wherein the loading request requests to load a to-be-loaded UI service, the loading request comprises a reuse path of the to-be-loaded UI service, and the reuse path of the to-be-loaded UI service indicates an access path of the to-be-loaded UI service, wherein the reuse path of the to-be-loaded UI service comprises a fuzzy version number of a UI service package comprising the to-be-loaded UI service, and the fuzzy version number indicates whether the UI service package meets a preset version condition;

determining a dependency of the to-be-loaded UI service based on a dependency graph, wherein the dependency graph indicates a dependency of at least one UI service in at least one UI service package, and indicates a UI service that references a UI service in the at least one UI service package as a dependency; and loading the to-be-loaded UI service and the dependency of the to-be-loaded UI service.

2. The method according to claim 1, wherein the dependency graph is obtained based on dependency relationship sets of one or more of the at least one UI service package.

3. The method according to claim 2, wherein the dependency relationship sets comprise a dependency relationship of at least one UI service in the one or more of the at least one UI service package, and the dependency relationship of the at least one UI service in the one or more of the at least one UI service packages indicates a dependency of the at least one UI service in the one or more of the at least one UI service package.

4. The method according to claim 1, wherein code of each UI service in the at least one UI service package comprises a reuse path, and the reuse path in the code of the UI service indicates an access path of a dependency of the UI service.

5. The method according to claim 1, wherein the at least one UI service package is a UI service package registered in at least one UI service package registration apparatus.

6. The method according to claim 5, wherein the at least one UI service package comprises a first UI service package, and a reuse path in code of a first UI service in the first UI service package meets at least one of the following conditions: the reuse path in the code of the first UI service indicates an access path of a second UI service, wherein the second UI service is a dependency of the first UI service, the second UI service is a UI service in a second UI service package, and the second UI service package is a UI service package different from the first UI service package; or the reuse path in the code of the first UI service indicates an access path of a runtime dependency item, wherein the runtime dependency item is a dependency of the first UI service, the runtime dependency item is a runtime dependency item in at least one common dependency UI service package, the at least one common dependency UI service package comprises at least one runtime dependency item, and the at least one common dependency UI service package provides a dependency for a UI service in at least one UI service package registered in the at least one UI service package registration apparatus, wherein the first UI service package is a UI service package in the at least one UI service package, and the first UI service is a UI service in the first UI service package.

7. The method according to claim 6, wherein the method further comprises:

when the dependency of the to-be-loaded UI service is a runtime dependency item, starting a driver of the runtime dependency item when the runtime dependency item is loaded for a first time in a process of loading the at least one UI service and the dependency of the to-be-loaded UI service.

8. The method according to claim 1, wherein the determining a dependency of the to-be-loaded UI service based on the dependency graph comprises:

determining a reuse path of the dependency of the to-be-loaded UI service based on the dependency graph.

9. The method according to claim 8, wherein before the loading the to-be-loaded UI service and the dependency of the to-be-loaded UI service, the method further comprises:

downloading the to-be-loaded UI service and the dependency of the to-be-loaded UI service based on the reuse path of the to-be-loaded UI service and the reuse path of the dependency of the to-be-loaded UI service; and the loading the to-be-loaded UI service and the dependency of the to-be-loaded UI service comprises:

loading the downloaded to-be-loaded UI service and the downloaded dependency of the to-be-loaded UI service.

10. The method according to claim 9, wherein the loading the downloaded to-be-loaded UI service and the downloaded dependency of the to-be-loaded UI service comprises:

sequentially loading the downloaded to-be-loaded UI service and the downloaded dependency of the to-be-loaded UI service based on a dependency relationship indicated by the dependency graph.

11. The method according to claim 1, wherein the method further comprises:

updating the dependency graph.

12. The method according to claim 1, wherein the method is applied to a loading apparatus, the loading apparatus comprises a first loading apparatus and a second loading apparatus, the first loading apparatus is isolated from the second loading apparatus, and both the first loading apparatus and the second loading apparatus are configured to load a UI service for a software system.

13. A chip system, wherein the chip system comprises one or more interface circuits and one or more processors; and the interface circuit and the one or more processors are interconnected through a bus; the interface circuit is configured to receive a signal from a memory, and send the signal to the processor, wherein the signal comprises computer instructions stored in the memory; and wherein the computer instructions, when executed by the one or more processors, cause the chip system to perform the following steps:

receiving a loading request, wherein the loading request requests to load a to-be-loaded UI service, the loading request comprises a reuse path of the to-be-loaded UI service, and the reuse path of the to-be-loaded UI service indicates an access path of the to-be-loaded UI service, wherein the reuse path of the to-be-loaded UI service comprises a fuzzy version number of a UI service package comprising the to-be-loaded UI service, and the fuzzy version number indicates whether the UI service package meets a preset version condition;

determining a dependency of the to-be-loaded UI service based on a dependency graph, wherein the dependency graph indicates a dependency of at least one UI service in at least one UI service package, and indicates a UI service that references a UI service in the at least one UI service package as a dependency; and loading the to-be-loaded UI service and the dependency of the to-be-loaded UI service.

14. The chip system of claim 13, wherein the dependency graph is obtained based on dependency relationship sets of one or more of the at least one UI service package.

15. The chip system of claim 14, wherein the dependency relationship sets comprise a dependency relationship of at least one UI service in the one or more of the at least one UI service package, and the dependency relationship of the at least one UI service in the one or more of the at least one UI service packages indicates a dependency of the at least one UI service in the one or more of the at least one UI service package.

16. The chip system of claim 13, wherein code of each UI service in the at least one UI service package comprises a reuse path, and the reuse path in the code of the UI service indicates an access path of a dependency of the UI service.

17. The chip system of claim 13, wherein the at least one UI service package is a UI service package registered in at least one UI service package registration apparatus.

18. A computer device, comprising at least one processor and a memory, wherein the memory stores computer instructions, and the computer instructions, when executed by the at least one processor, cause the computer device to perform the following steps:

receiving a loading request, wherein the loading request requests to load a to-be-loaded UI service, the loading request comprises a reuse path of the to-be-loaded UI service, and the reuse path of the to-be-loaded UI service indicates an access path of the to-be-loaded UI service, wherein the reuse path of the to-be-loaded UI service comprises a fuzzy version number of a UI service package comprising the to-be-loaded UI service, and the fuzzy version number indicates whether the UI service package meets a preset version condition;

determining a dependency of the to-be-loaded UI service based on a dependency graph, wherein the dependency graph indicates a dependency of at least one UI service in at least one UI service package, and indicates a UI service that references a UI service in the at least one UI service package as a dependency; and loading the to-be-loaded UI service and the dependency of the to-be-loaded UI service.

19. The computer device of claim 18, wherein the dependency graph is obtained based on dependency relationship sets of one or more of the at least one UI service package.

20. The computer device of claim 19, wherein the dependency relationship sets comprise a dependency relationship of at least one UI service in the one or more of the at least one UI service package, and the dependency relationship of the at least one UI service in the one or more of the at least one UI service packages indicates a dependency of the at least one UI service in the one or more of the at least one UI service package.

* * * * *

UNITED STATES PATENT AND TRADEMARK OFFICE
CERTIFICATE OF CORRECTION

| | | |
|---|---|---|
| PATENT NO. | : 12,333,282 B2 | Page 1 of 1 |
| APPLICATION NO. | : 18/064566 | |
| DATED | : June 17, 2025 | |
| INVENTOR(S) | : Yuan Ding et al. | |

It is certified that error appears in the above-identified patent and that said Letters Patent is hereby corrected as shown below:

On the Title Page

In Column 2 item (56) (Foreign Patent Documents), In Line 2, Below "16/9574" delete "CN 1057011113 A * 6/2016".

Signed and Sealed this
Sixteenth Day of September, 2025

Coke Morgan Stewart
*Acting Director of the United States Patent and Trademark Office*